United States Patent [19]

Hasegawa et al.

[11] Patent Number: 5,010,420
[45] Date of Patent: Apr. 23, 1991

[54] IMAGE PROCESSING APPARATUS

[75] Inventors: Takanori Hasegawa, Hachioji; Nobuyuki Abe, Toride; Toru Hibara, Tachikawa; Toshihiko Hirose, Yatsushiro; Takashi Kanda, Kofu; Hiroshi Saito; Masaki Oshima, both of Koma; Eiji Nakazawa, Nirasaki, all of Japan

[73] Assignees: Riso Kagaku Corporation, Tokyo; Nippon Seimitsu Kogyo Kabushiki Kaisha, Kofu, both of Japan

[21] Appl. No.: 426,550

[22] Filed: Oct. 25, 1989

[30] Foreign Application Priority Data

| Oct. 31, 1988 | [JP] | Japan | 63-275789 |
| Oct. 31, 1988 | [JP] | Japan | 63-275790 |
| Oct. 31, 1988 | [JP] | Japan | 63-142163[U] |
| Oct. 31, 1988 | [JP] | Japan | 63-142164[U] |
| Oct. 31, 1988 | [JP] | Japan | 63-142165[U] |
| Oct. 31, 1988 | [JP] | Japan | 63-142166[U] |
| Oct. 31, 1988 | [JP] | Japan | 63-142167[U] |
| Oct. 31, 1988 | [JP] | Japan | 63-142168[U] |

[51] Int. Cl.⁵ .......................................... H04M 1/40
[52] U.S. Cl. .............................. 358/471; 358/475; 358/487; 358/496
[58] Field of Search ................ 350/471, 475, 487, 496

[56] References Cited

U.S. PATENT DOCUMENTS

| 4,656,525 | 4/1987 | Norris | 358/487 |
| 4,807,041 | 2/1984 | Kishi et al. | 358/487 |
| 4,831,455 | 5/1984 | Ishikawa et al. | 350/471 |
| 4,916,550 | 4/1990 | Miyake et al. | 358/471 |
| 4,939,580 | 7/1990 | Ishikawa et al. | 358/471 |
| 4,958,240 | 9/1990 | Abe | 358/471 |

Primary Examiner—Edward L. Coles, Sr.
Attorney, Agent, or Firm—Kanesaka and Takeuchi

[57] ABSTRACT

An image processing apparatus furnished with an overhead projector has an image projecting function and an image-forming function. The image processing apparatus is designed to detect the movement of an original support table or a reflection-type focusing plate during projecting of an original. The result is that the original support table is free from being heated by the focusing plate and also that the focusing plate is free from any deviation of its axis of light, thus preventing the reflected light from striking on the eyes of the operator.

7 Claims, 21 Drawing Sheets

FIG. 9(E)
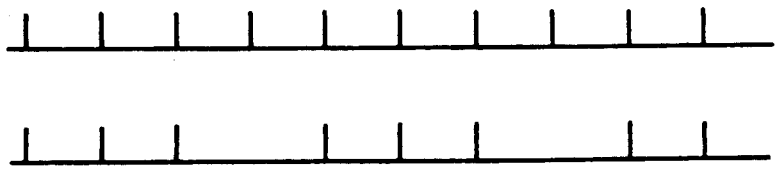
FIG. 9(F)
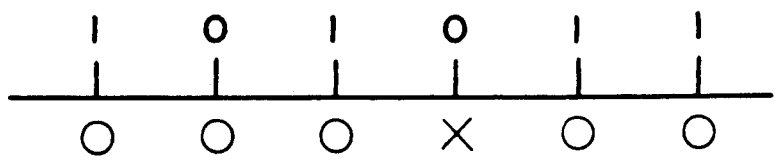
FIG. 9(G)
| 1 | 2 | 3 | 5 | 6 | 7 | 9 | 10 | 11 | ······ | 1727 | BLANK |
1 2 3 4 5 6 7 8 9   1296   1728
NOTE: EACH FIGURE IN FRAME STANDS FOR THE NUMBER OF A PHOTOELECTRIC ELEMENT IN IMAGE SENSOR.

FIG. 11(D)
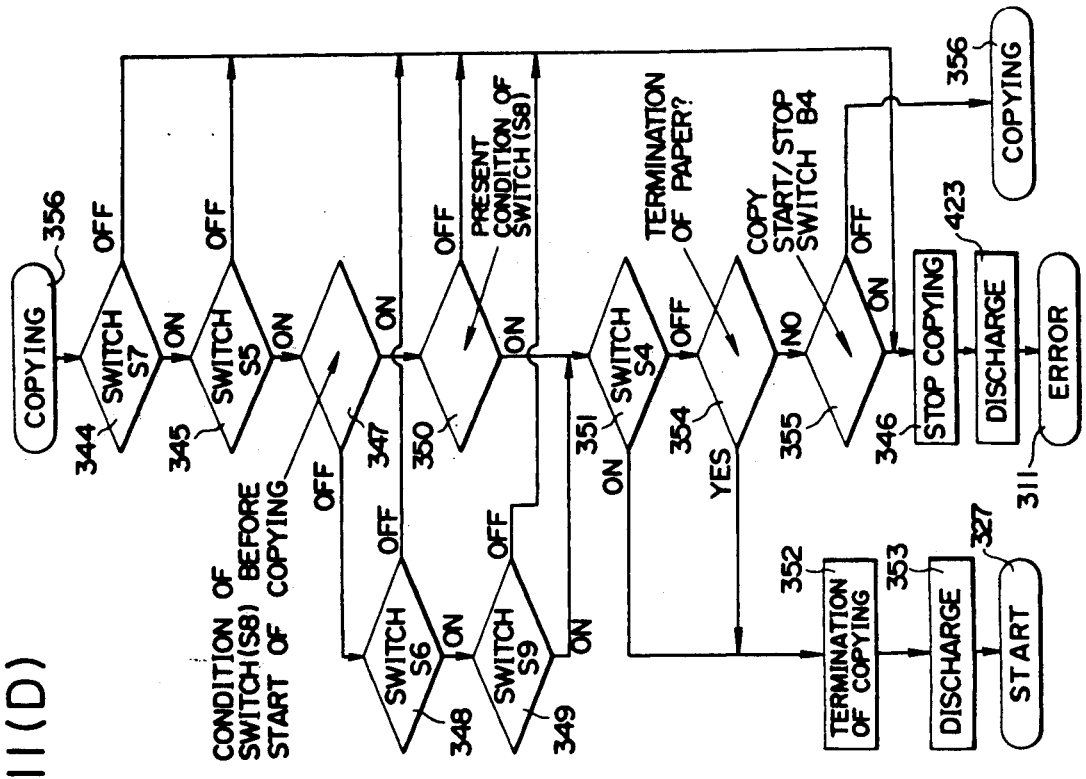
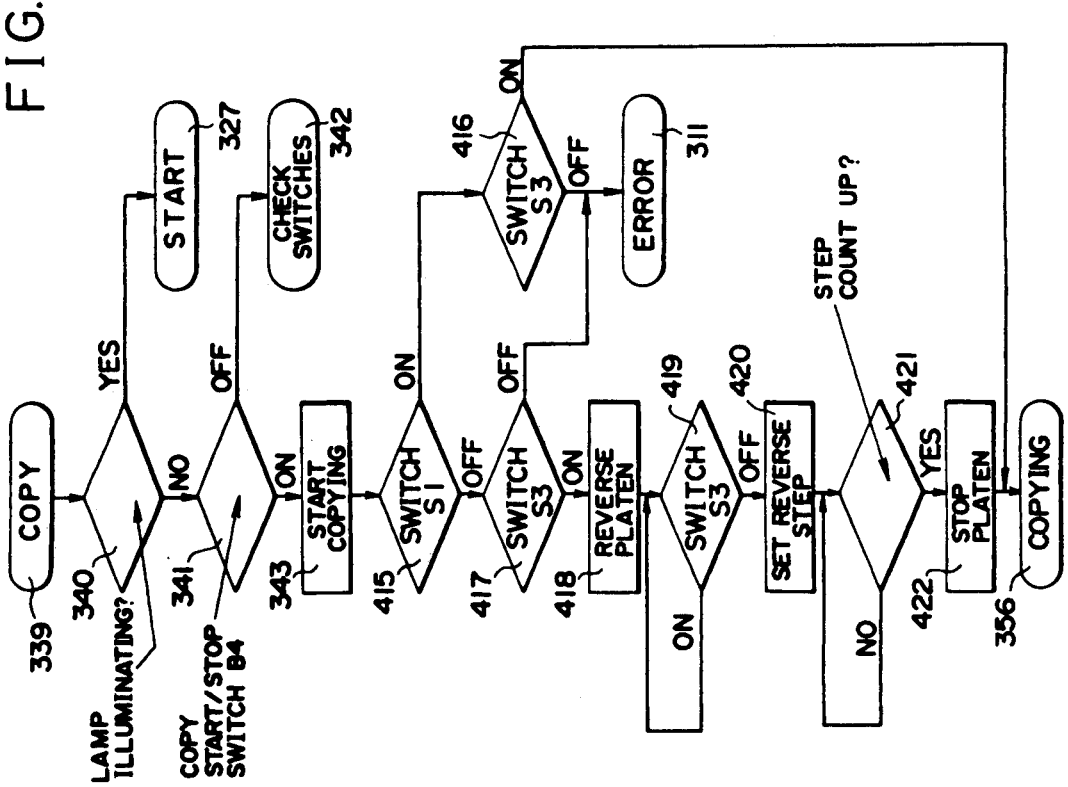

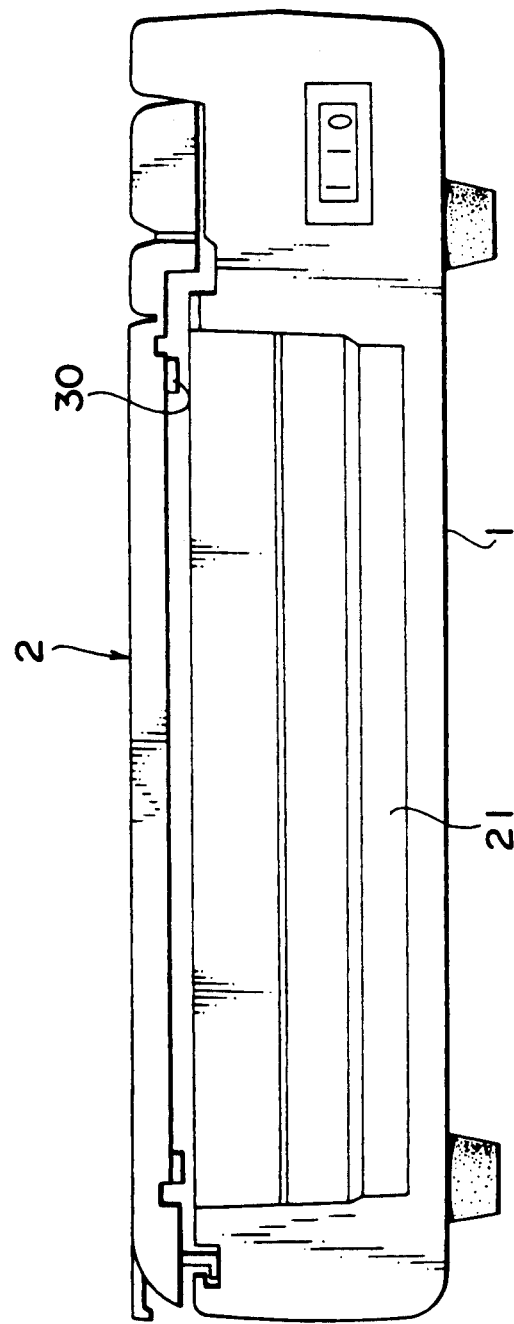

IMAGE PROCESSING APPARATUS

BACKGROUND OF THE INVENTION

1. Field of the Invention

The present invention relates to an image processing apparatus having a function of projecting the image of an original on a screen, like an overhead projector, and a function of forming an image of the original on a paper or a transparent sheet, like a copying machine.

2. Description of the Related Art

Conventional overhead projectors (hereinafter called "OHP") can be divided into two groups: transparence-type, and reflection-type.

In the transparence-type OHP, an original placed on a transparent support table is illuminated from the underside of the support table, and an image of the original is projected on a screen via a projector lens and a reflector mirror, both disposed above the support table.

In the reflection-type OHP, an original on a fresnel lens is illuminated from the upper side of the fresnel lens and a reflected image of the original is projected on the screen via a projector lens and a reflector mirror, both disposed above the fresnel lens.

Apart from a simple original that can be formed by manually drawing or writing a figure or a character directly on a transparent sheet with a pen, an ordinary original to be used in the OHP is formed by copying an image on a transparent sheet by using an electrophotographic copying machine, for example.

When giving a lecture, a presentation or a briefing by using an OHP at a school, a presentation site or a meeting room, it is necessary to prepare an OHP original in advance. Therefore, no more original which has not been prepared cannot readily be projected on the screen to add any unscheduled explanation, for example, unless there is a copying or printing machine around.

To this end, a solution has been proposed in which an OHP is combined with a copying machine so that an original to be projected can be readily prepared by the copying machine. In this prior art apparatus, a support table is movably mounted on an apparatus body; during projecting, the support table is moved away from a focusing plate disposed on the top of the body, and the original on the focusing plate is illuminated by a lamp built in a projecting unit so that the light reflected on the focusing plate falls on the projecting unit.

With this prior arrangement, during projecting, when the retracted support table is moved to a position such as to cover the reflection-type focusing plate illuminated with light from the light source and remains in this position, the support table can be easily distorted or deformed.

Still during projecting, when the original cover on which the reflection-type focusing plate is plated is opened, the central axis of light of the focusing plate would deviate to cause the reflected light to strike on the eyes of the operator.

SUMMARY OF THE INVENTION

It is therefore an object of the present invention to provide an image processing apparatus in which during projecting, the movement of a support table over a reflection-type focusing plate is detected to turn a lamp as a light source off, thus preventing the reflected light from striking on the eyes of the operator.

Another object of the invention is to provide an image processing apparatus in which during projecting, the movement of the reflection-type focusing plate is detected in terms of the opening of the original cover to turn the lamp off, thus eliminating the foregoing prior art problems.

According to the present invention, there is provided an image processing apparatus comprising: an input unit for inputting an image of an initial original in terms of image signals; a support table on which the initial original is to be set, the support table being movably mounted alongside the input unit; an image processing unit for processing the image signals from the input unit; an image forming unit for forming on a continuous sheet a subject image according to the image signals processed by the image processing unit to provide an OHP original; a reflection-type focusing plate on which the OHP original is to be set, the reflection-type focusing plate being movably disposed alongside the input unit, said reflection-type focusing plate being pivotally movable about a shaft; a projecting unit disposed above the reflection-type focusing plate for projecting the subject image of the OHP original set on the reflection-type focusing plate; and means for detecting the movement of the support table or the reflection-type focusing plate to deenergize the projecting unit.

The above and other advantages, features and additional objects of the present invention will be manifest to those versed in the art upon making reference to the following detailed description and the accompanying drawings in which certain structural embodiment incorporating the principles of the present invention is shown by way of illustrative example.

BRIEF DESCRIPTION OF THE DRAWINGS

FIG. 11(A) through 11(D) are flowcharts of various operations of the apparatus;

FIG. 12 is a side elevational view of a modified apparatus according to another embodiment of the present invention;

DETAILED DESCRIPTION

Figure 1:
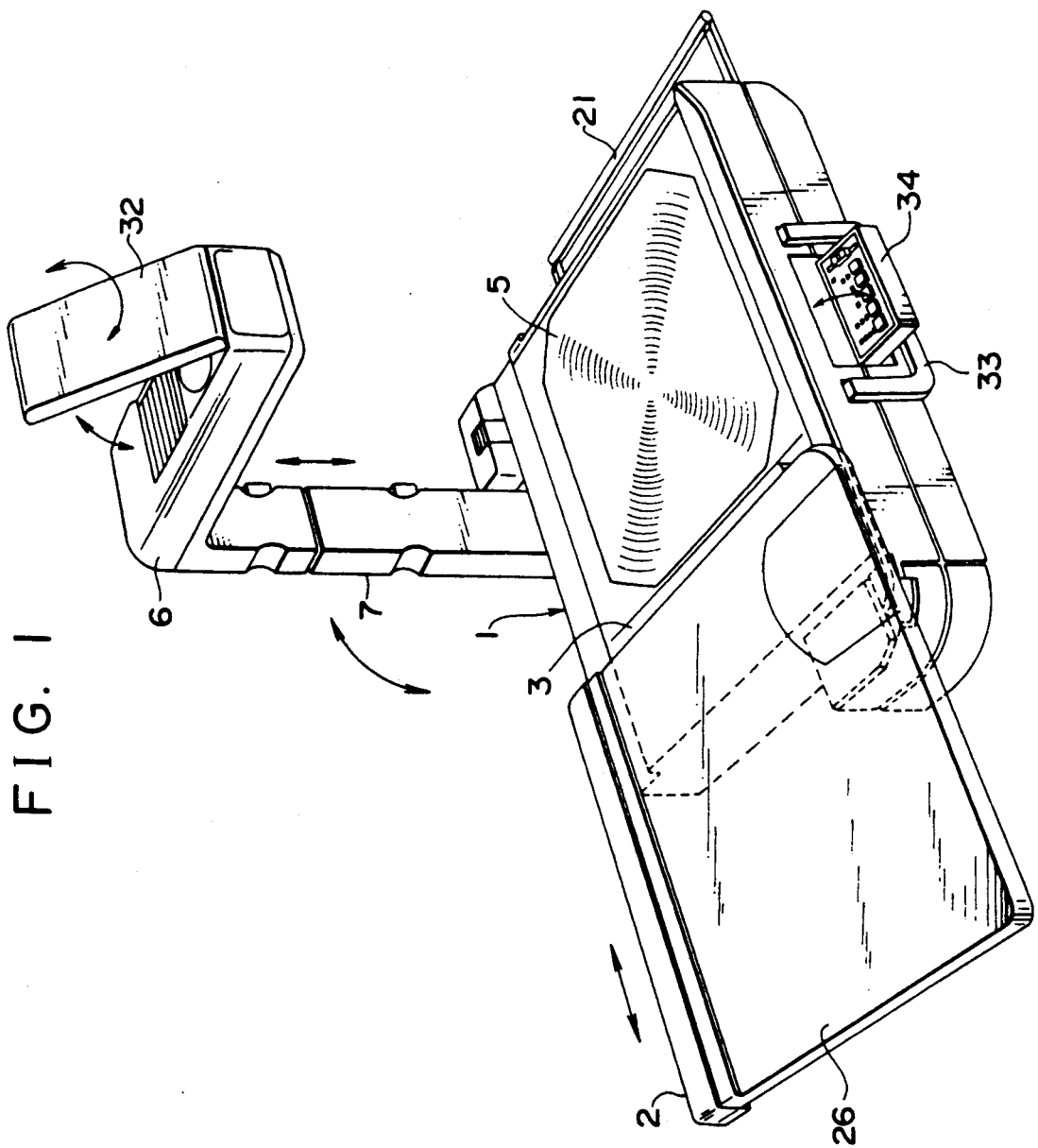
FIG. 1 is a perspective view of an image processing apparatus embodying the present invention, showing the apparatus as it is used as OHP.
Figure 2:
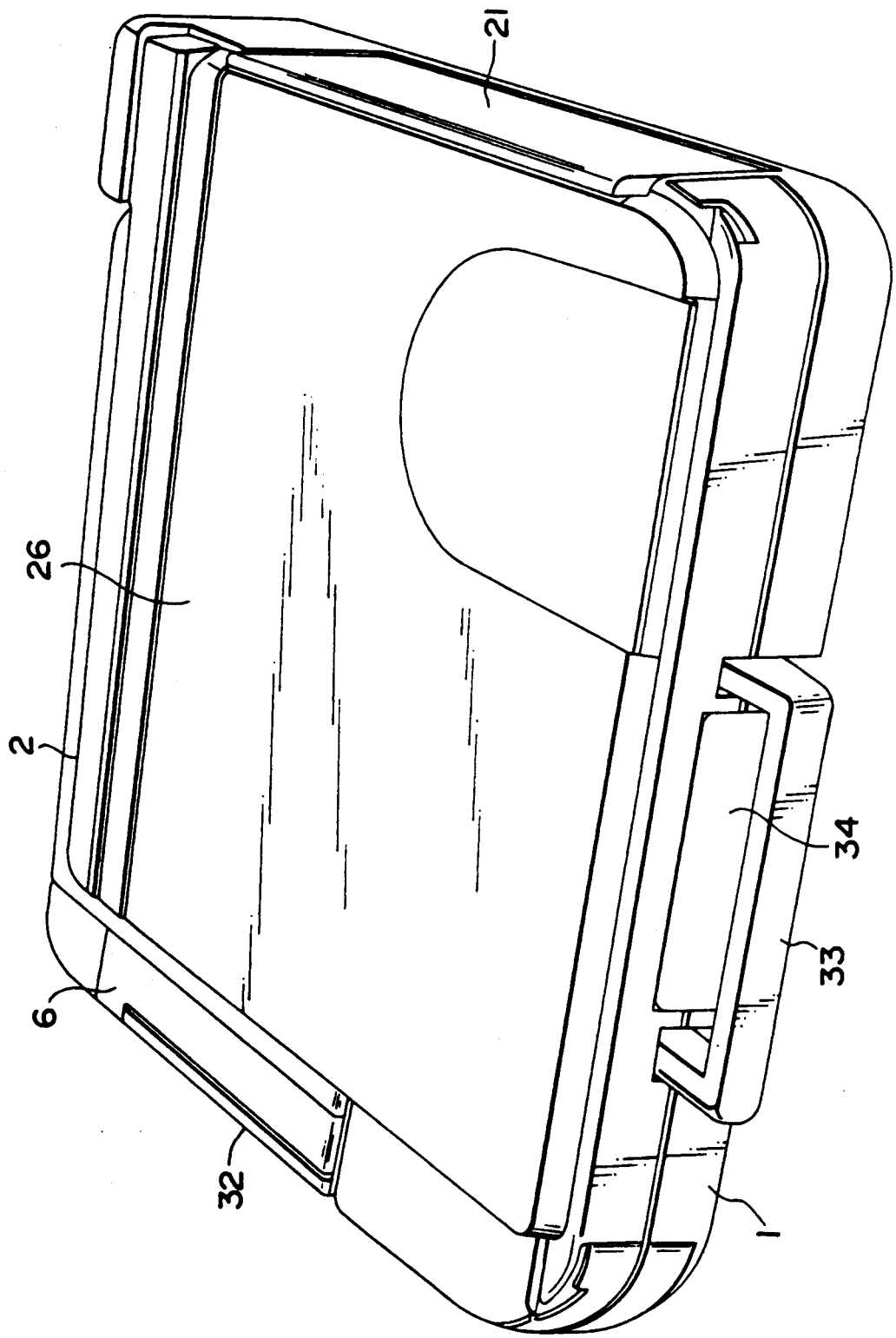
FIG. 2 is a perspective view of the apparatus with various parts or units accommodated in their predetermined position.

The principles of the present invention are particularly useful when embodied in an image processing apparatus (hereinafter called "apparatus") such as shown in FIGS. 1 through 4.

As shown in FIGS. 1 through 7, the apparatus generally comprises a body 1 having a function of forming an original such as by copying, a support table 2 movably mounted on the top of the body 1, and an image input unit for inputting an image of an original, e.g., a read-out unit 3 mounted on the upper surface of the body 1 for scanning the original; on the support table 2. Designated by 4 is an image forming mechanism, e.g., a printing mechanism, mounted in the body 1.

The apparatus also comprises a reflection-type focusing plate 5 mounted on the upper surface of the body 1 in parallel to the read-out unit 3, and a projecting unit 6 secured to the side of the body 1 and supported over the focusing plate 5.

The image forming function, e.g., the copying function, of the body 1 is performed jointly by the support table 2, the read-out unit 3 and the printing mechanism 4.

Figure 3:
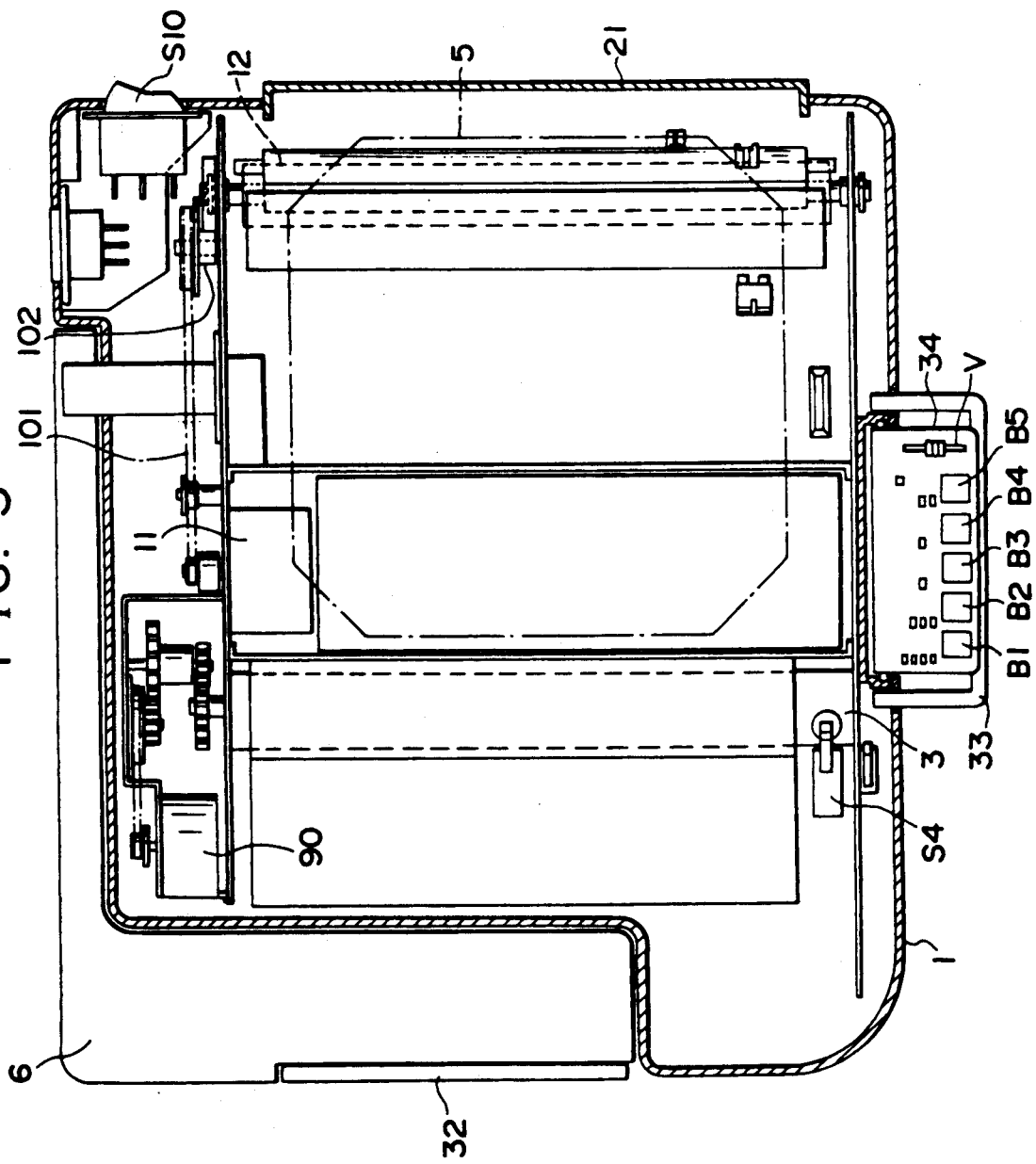
FIG. 3 is a plan view of FIG. 2, showing the interior of the apparatus.
Figure 4:
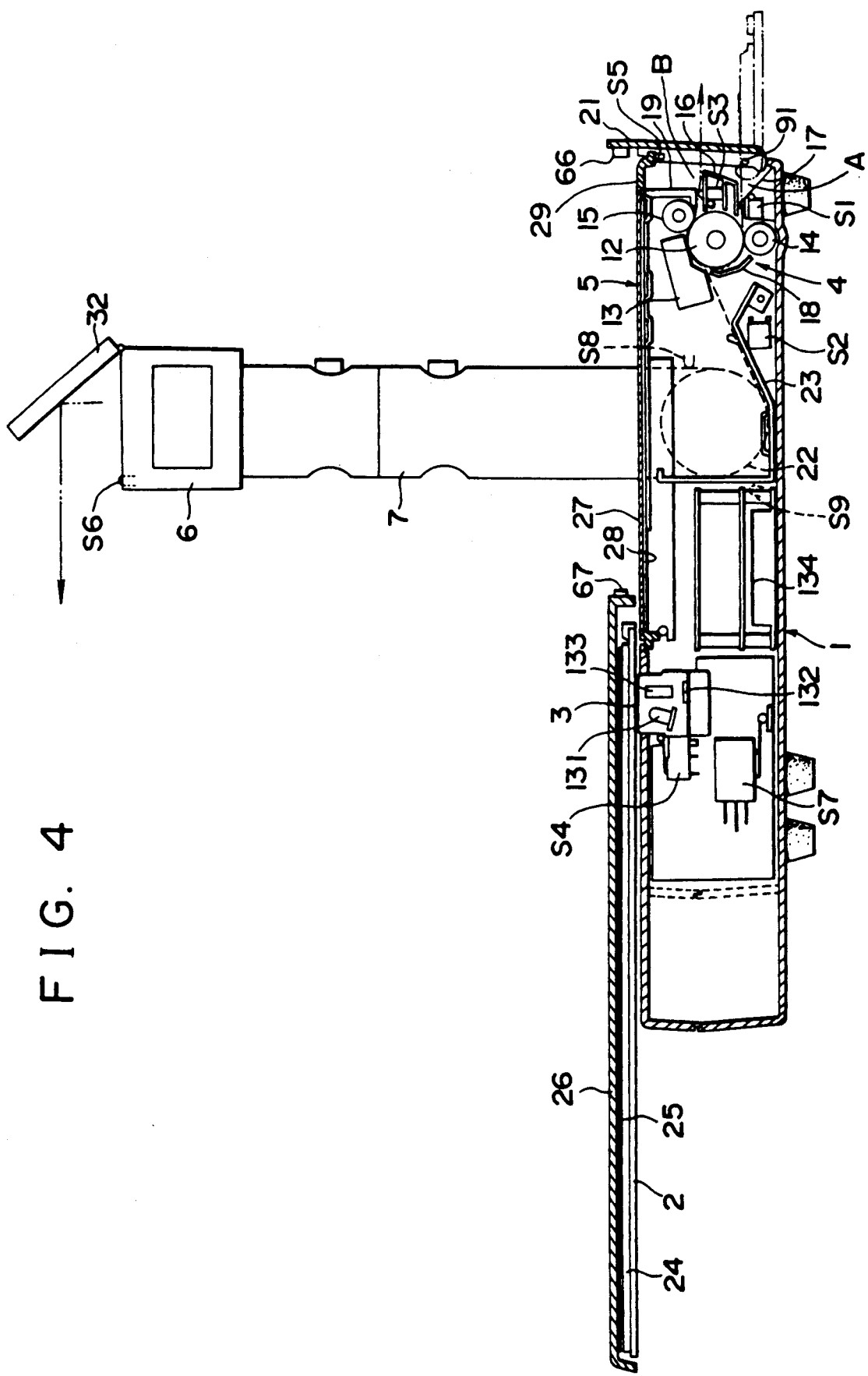
FIG. 4 is a vertical cross-sectional view of FIG. 1, showing the apparatus as it is used as OHP.

The printing mechanism 4 is composed of a printing means, an automatic paper-supply means for automatically supplying a paper from a roll accommodated in the body 1, a manual paper-supply means for supplying a sheet of paper at a time by hand, and a paper-discharge means. Specifically, as shown in FIGS. 3 and 4, a platen 12 for being driven by a motor 11 is furnished with the printing means, e.g., a thermal head 13, a supply roller 14 disposed in contact with the lower portion of the platen 12, and a discharge roller 15 disposed in tact with the upper portion of the platen 12. A paper inlet port A is composed of upper and lower guides 16, 17, through which a sheet of paper may be inserted into the body 1 by hand. The paper from the inlet port A is supplied by the supply roller 14 to the platen 12 via an auxiliary guide 18 which serves to reversely supply the paper onto the platen 12. Another auxiliary guide 19 is disposed at a paper outlet port B in confronting relation to the upper guide 16. Thus the inlet and outlet ports A, B are arranged at one and the same end of the body 1; when it is not in use, the inlet and outlet ports A, B are closed by a paper-delivery tray 21 pivotally mounted on the body 1. When it is in use, the paper-delivery tray 21 is pivotally moved about a shaft 91 from the solid-line position to the phantom-line position (FIG. 4) to open both the inlet and outlet ports A, B.

The motor 11 transmits rotation, as reduced to a predetermined rate, to the platen 12 via a timing belt 101 and an intermediate gear 102.

A roll-paper tray 23, which is mounted in the body 1, serves as a guide to assist in supplying the paper from the roll 22 onto the platen 12 and then to the discharge roller 15. Designated by S1 is a paper-supply switch (or sensor); S2, a roll-paper detecting switch; S3, a paper-discharge switch.

The support table 2 includes a transparent plate 24, such as a sheet of glass, for supporting thereon an original 25. An original cover mounted on one end of the transparent plate 24 by means of a shaft (not shown); when the original cover 26 is in open position, an original 25 to be copied as described below can be placed on the support table 2. As it is driven by the motor 90, the support table 2, together with the original cover 26, is moved between the focusing plate 5 and the read-out unit 3. The read-out unit 3 is composed of a contact-type image sensor 132, for example, and is furnished with a switch S4 for detecting the termination of copying of an original 25.

As the read-out unit 3 starts reading the original, the support plate 2 is moved in timed relation to the reading. During that time, the rays of light illuminating the original 25 from a light source 131, such as a lamp, through the transparent plate 24 is focused on the contact-type image sensor 132 by means of an array of focusing lens 133, and as a result, the original 25 is read out at regular intervals in subscanning direction. The data of every line having been read out is digitalized in binary codes bit by bit in the primary scanning direction.

Figure 9:
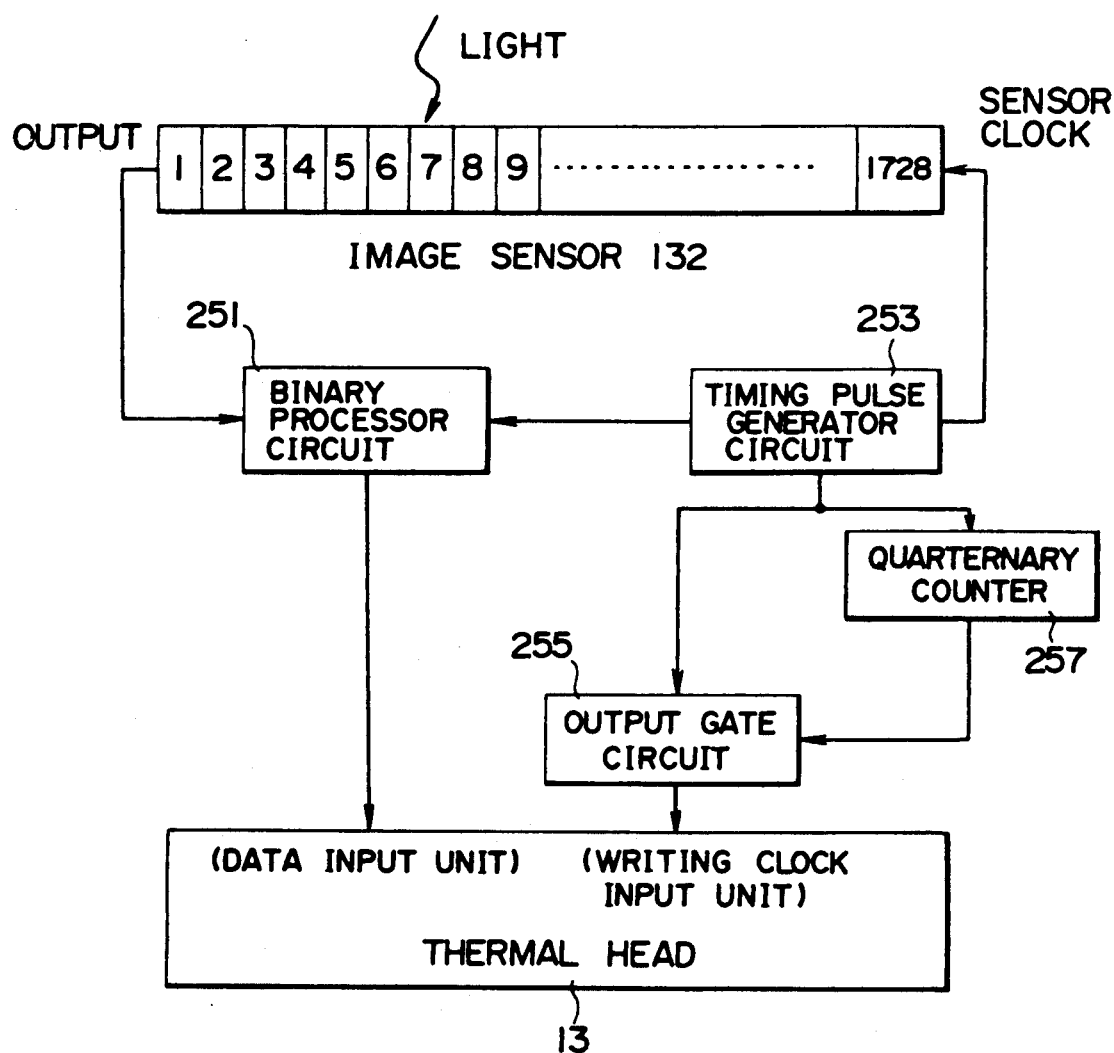
FIGS. 9(A) through 9(G) illustrate the function of forming a reduced image.

The binary processing will now be described in detail. As shown in FIG. 9(A), the image sensor 132 is composed of a number of photoelectric transducer elements arranged in a line; when light is illuminated over the original 25, each of the photoelectric transducer elements stores an amount of electric charge commensurate with the amount of illuminated light. The data in terms of light from the image sensor 132 are processed by a binary processor circuit 251 and are then inputted to the thermal head 13 from a data input unit. A timing pulse generator circuit 253 outputs a timing pulse to the image sensor 132, the binary processor circuit 251 and an output gate circuit 255. When a timing pulse is outputted from the timing-pulse generator circuit 253 to the output gate circuit 255, the timing pulse is divided into two parts; one part of the timing pulse is outputted directly to the output gate circuit 255, while the other part is outputted to the output gate circuit 255 via a quaternary counter 257. Then the pulse sorted by the output gate circuit 255 is inputted to the thermal head 13 from a writing clock input unit.

Figure 9B:
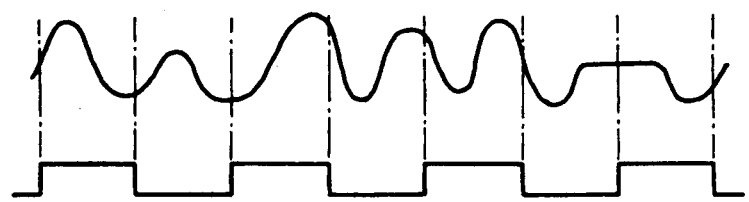
Figure 9C:
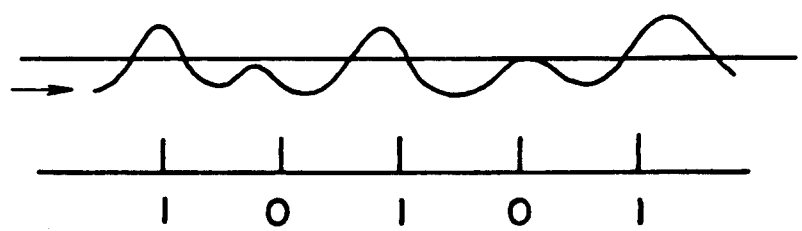
Figure 9D:
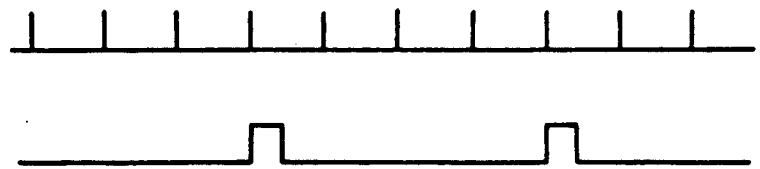

As shown in FIG. 9(B), the image sensor 132 produces an amount of voltage, as an output, proportional to the electric charge stored in the individual photoelectric transducer element, at the same timing with a sensor clock pulse produced by the timing pulse generator circuit 253. Then, as shown in FIG. 9(C), if this output is over or under the slice level at the pulse of the timing pulse generator circuit 253, it is determined as 1 or 0. Thus the output of the timing pulse generator circuit 253 has been digitalized. This digitalization is performed by the binary processing circuit 251. Now if copying is made as data are transmitted to the thermal head 13, an equiscale copy can be obtained. Alternatively, a reduced scale copy may be obtained and then may be projected as enlarged. For example, if binary processing is discontinued every four bits, every fourth bits of a single line are culled out to reduce the length of the line to $\frac{3}{4}$. Then if printing is made as data are transmitted to the thermal head 13 after complementing the culled-out single line with a blank by $\frac{1}{4}$, an image reduced to $\frac{3}{4}$ in the primary scanning direction can be obtained. In other words, as the timing pulses outputted from the timing pulse generator circuit 253 are counted by the quaternary counter 257, it is possible to issue a pulse every fourth timing pulses, as shown in FIG. 9(D). Assuming that a timing pulse is outputted when the output of the quaternary counter 257 is 0 and that outputting of a timing pulse is stopped by the output gate circuit 255 when the output of the quaternary counter 257 is 1, a timing clock pulse of FIG. 9(E) can be obtained. Since only when a pulse is inputted to the writing clock input unit, the thermal head 13 fetches the data in the data input unit supplied from the binary processor circuit 251, a portion indicated by X in FIG. 9(F) is ignored. As a result, the data stored in the thermal head 13 are as shown in FIG. 9(G). This is the method of reducing data to 1 in the primary scanning direction.

Regarding the subscanning direction, it is possible to reduce data to 1 by determining the line feed speed to be 4/3 with respect to the paper feed speed of the platen 12.

As the printing is thus made, the original is copied on a transparent sheet for OHP on a reduced scale of 1. The resultant copy is then placed on the focusing plate 5 so that the transparent original can be projected on an enlarged scale. The projecting function of the projecting unit 6 is such that the focus of a projecting lens (described below) can be adjusted, irrespective of the distance between the screen and the body 1. Therefore, the image may be projected on an enlarged scale depending on the purpose.

Now if the image is reduced only in the subscanning direction with maintaining the same-scale writing in the thermal head, the image is compressed into a flat form; that is, a flat projected image can be obtained. The resulting projected image is good in resolution with respect to the primary scanning direction.

Figure 5:
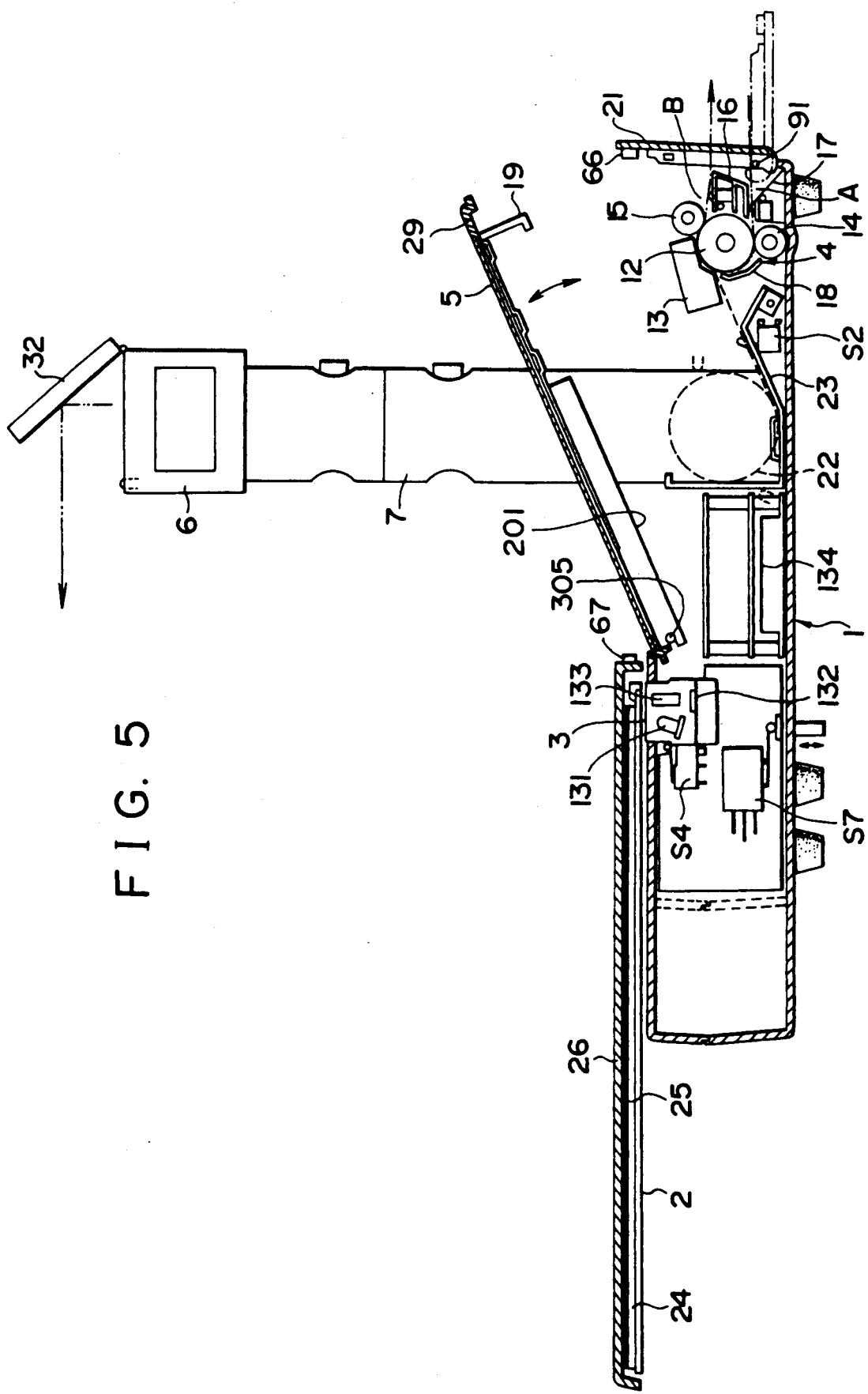
FIG. 5 is a view similar to FIG. 4, but showing the focusing plate in an open position.

The reflection-type focusing plate 5 generally includes a fresnel lens 27 and a reflecting layer 28 formed on the rear surface of the fresnel lens 27 by vacuum evaporation of metal. The focusing plate 5 is held by a support frame 201, one end of which is pivotally mounted on the body 1 by a shaft 305, as shown in FIG. 5. The switch S5 is a switch for detecting whether the focusing plate 5 is set precisely in the body 1, as shown in FIG. 4. The printing mechanism 4 is disposed under the focusing plate 5 in the body 1. In the illustrated embodiment, the printing mechanism 4 including the thermal head 13 is used as the image forming mechanism. Alternatively, the image forming mechanism may be an electrophotographic copying machine, a laser printer or the like.

Figure 6:
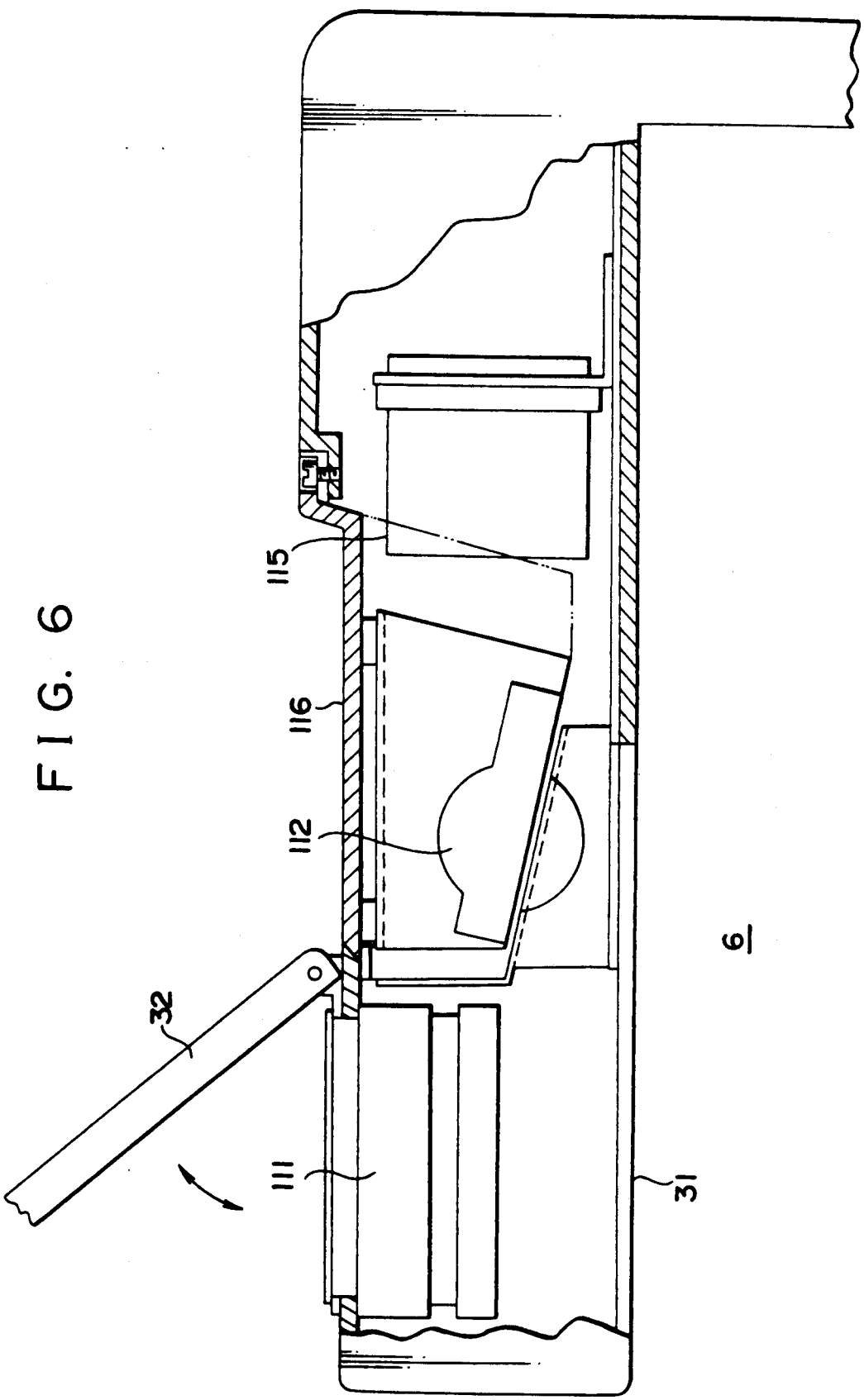
FIG. 6 is an enlarged detail cross-sectional view of a projecting unit of the apparatus.
Figure 8:
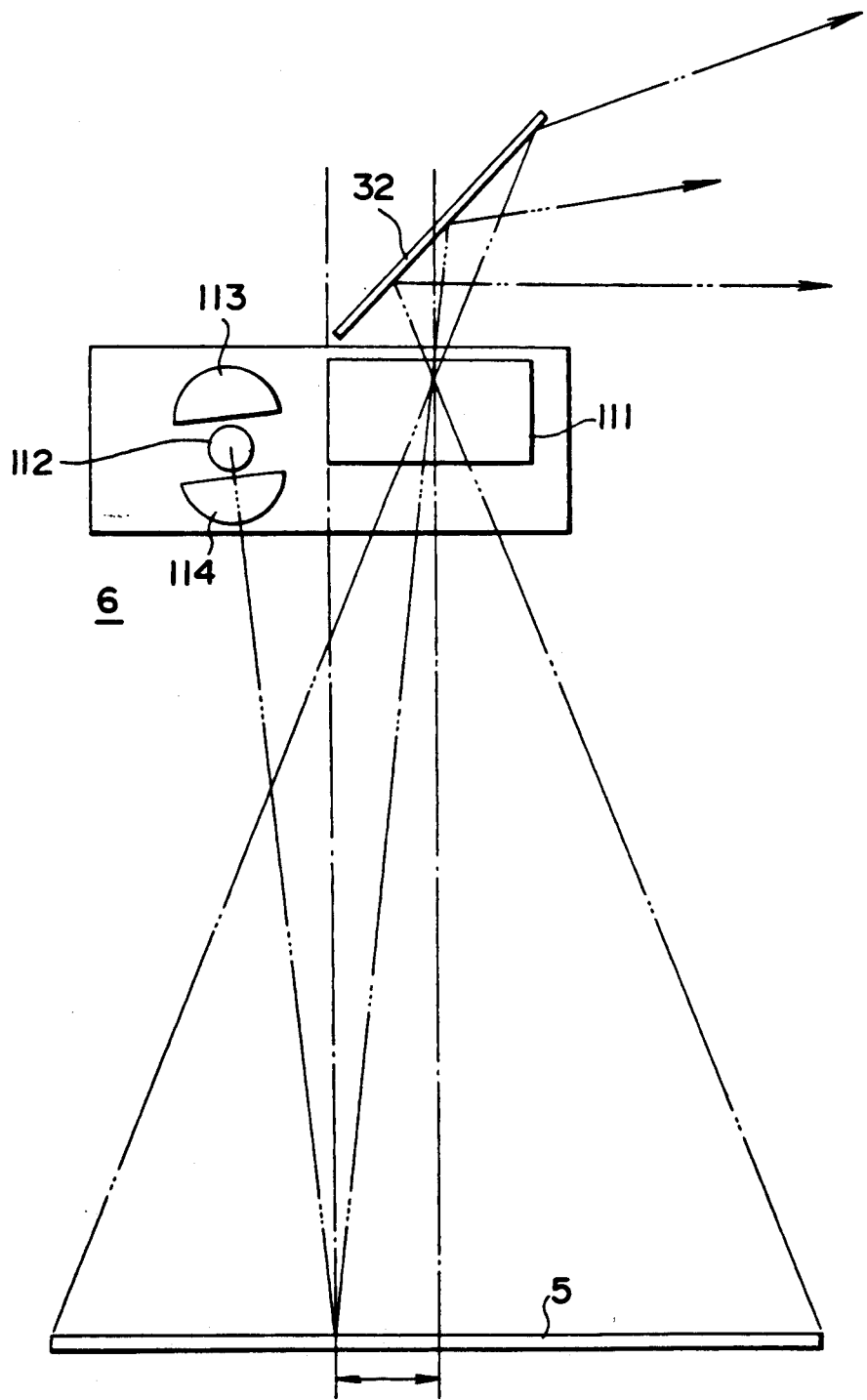
FIG. 8 is a schematic view showing the optical system of OHP.

The projecting unit 6 is swingably mounted on the one side of the body 1 via an arm 7; when utilizing the image forming function of the apparatus, the projecting unit 6 is laid flat along the side of the body 1. The projecting unit 6 can be accommodated along the side of the body 1 remotely from the paper inlet and outlet ports A, B so that the image forming function can be utilized. The projecting unit 6, as shown in FIGS. 6 and 8, has within a frame 31 a projecting lens 111, a lamp 112, i.e. a halogen lamp, for illuminating the transparent original placed on the focusing plate 5, a reflector mirror 113 disposed on one side of the lamp 112, a focusing lens 114 disposed on the other side of the lamp 112, and a cooling fan 115. If a closure 116 mounted on the upper surface of the projecting unit 6 is opened, the lamp 112 can be removed for replacement with a new one. The reflector mirror 32 is angularly movable through an angle of 360° about the projecting lens 111 so that the original can be projected in all directions.

As shown in FIG. 8, light from the lamp 112, together with the light reflected by the reflector mirror 113, is projected on the focusing plate 5 by the focusing lens 114. The fresnel lens constituting the focusing plate 5 is an eccentric mirror; the center of size of the mirror is aligned with the center of the projecting lens 111, while the optical center of the fresnel lens displaced to an eccentric extent is disposed centrally between the lamp 112 and the projecting lens 111. Since the center of size of the fresnel lens is aligned with the center of the reflector mirror 32, the image of the transparent original placed on the fresnel lens is completely covered by the projecting lens 111 without cutting any part of the image.

Figure 7:
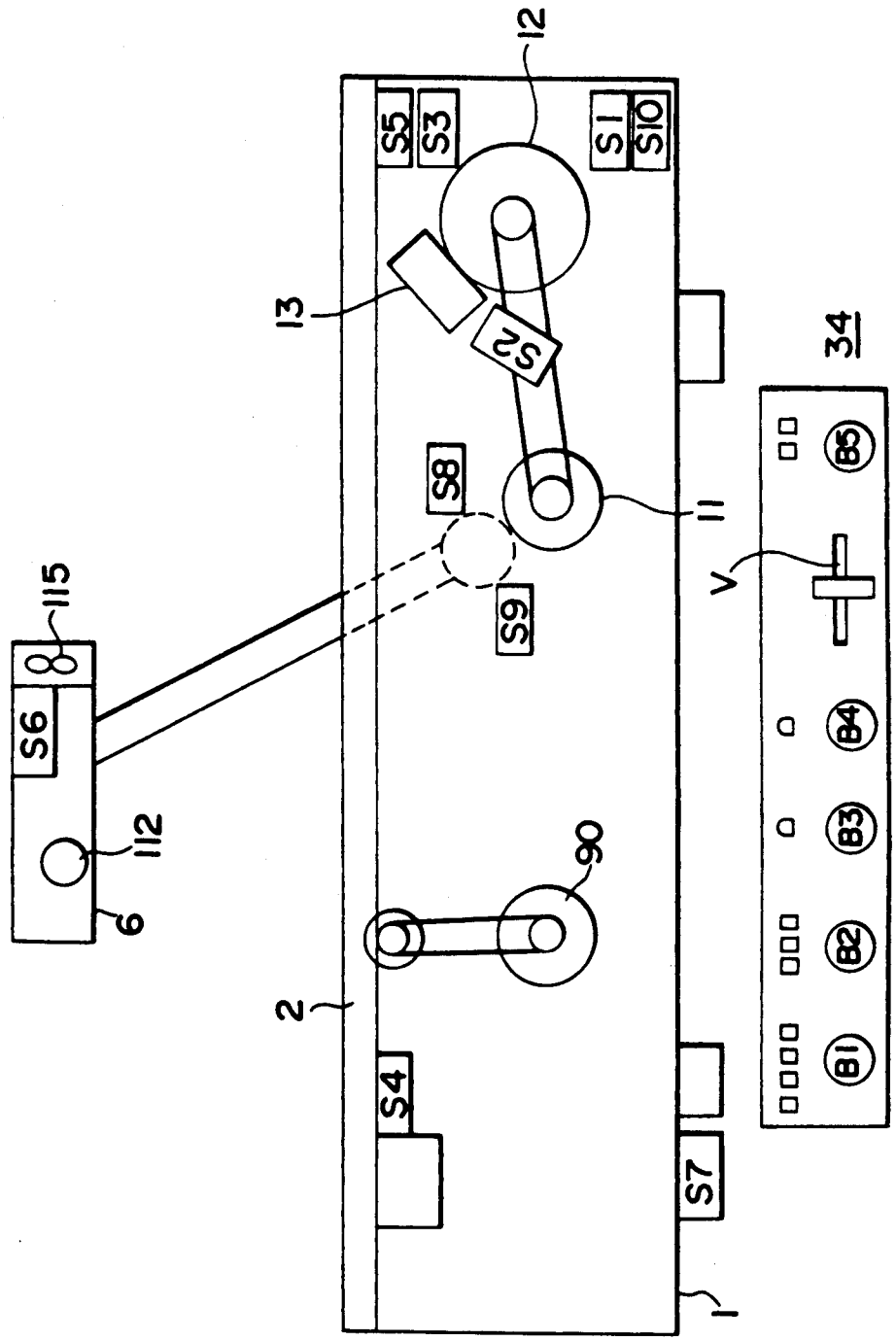
FIG. 7 is a schematic view showing the arrangement of various switches.

S6 designates a switch for detecting whether the reflector mirror 32 is accommodated in the projecting unit 6, and S7 designates a switch mounted on the body 1, as shown in FIG. 7. Further, S8 designates a switch for detecting whether the projecting unit 6 is disposed in an operative position, while S9 designates a switch for detecting whether the projecting unit 6 is disposed in an accommodated position. Accordingly, when the projecting unit 6 is accommodated along the body 1, the lamp 112 is switched off without fail in response to the detection of the position of the projecting unit 6.

When the projecting unit 6 is not disposed in the accommodated position or the operative position, copying cannot be done so that any collision of the support table 2 against the projecting unit 6 can be prevented. Thus the lamp 112 cannot be turned on unless the switch S8 is switched on; when he switched off while the lamp 112 is on light, the lamp 112 is turned off immediately.

A friction mechanism is mounted on the shaft 8 by which the projecting unit 6 is pivotally connected to the body 1 via the arm 7.

Figure 10:
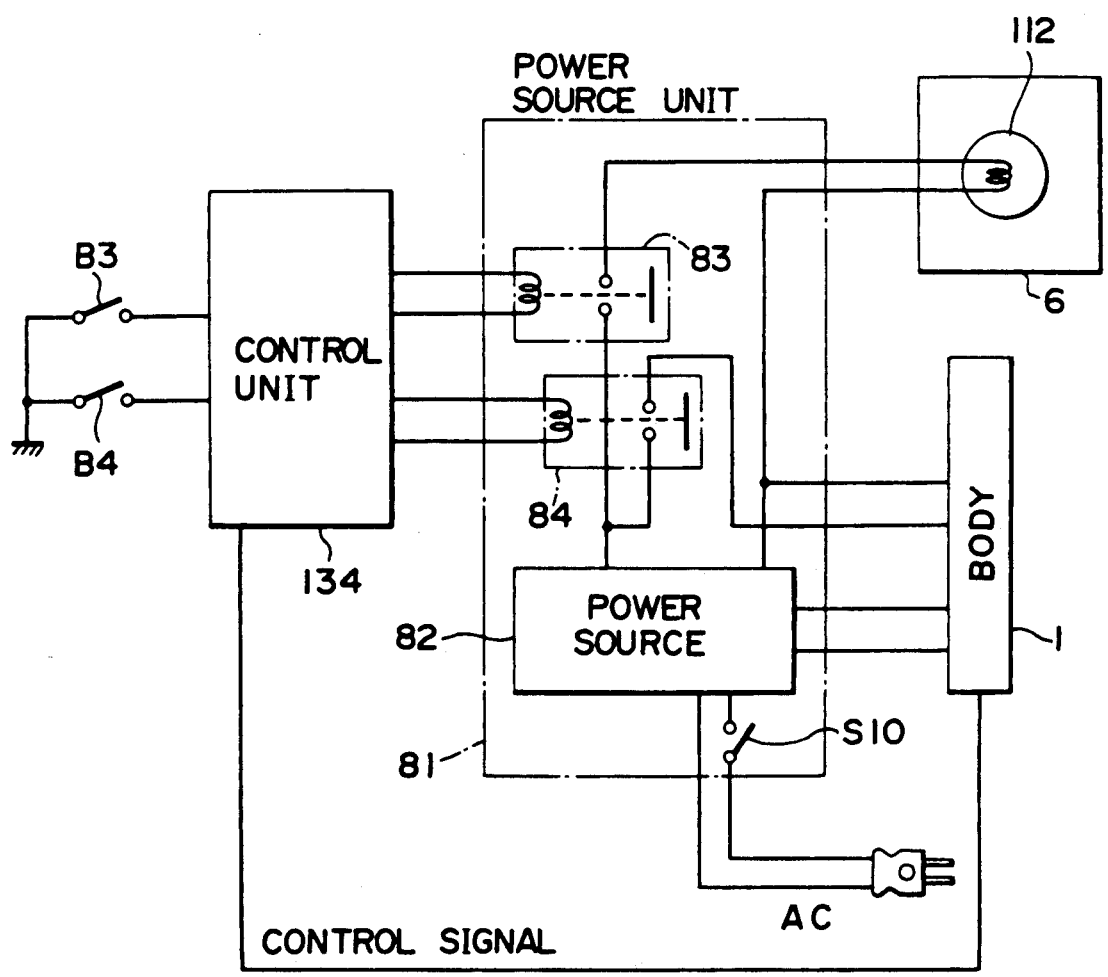
FIG. 10 is a wiring diagram of a switch control circuit.

To the body 1 and the lamp 112, as shown in FIG. 10, a power source unit 81 which is controlled by a controlling unit 134 such as a central processing unit is connected. The power source unit 82 includes a power source switch S10, a power source 82, a first relay 83 disposed between the power source 82 and the lamp 112, and a second relay 84. By the control by the controlling unit 134, both the relays 83, 84 are prevented from making connections.

The capacity of the power source 82 is set to a value larger than the larger one of the consumptions of the body 1 and the lamp 112 and smaller than the sum of the consumptions of the body 1 and the lamp 12.

As shown in FIG. 1, a handle 33 is pivotally mounted on the body 1 at one side remote from the projecting unit 6, and an operation panel 34 is disposed inwardly of the handle 33 and is pivotally mounted on the side of the body 1. On the operation panel 43, as shown in FIGS. 3 and 7, there are provided a paper selection switch B1, a magnification or selection switch B2, a lamp switch B3 for turning the lamp 112 on and off, a copy start/stop switch B4, a mode (character/photo) change-over switch B5, and a concentration adjusting knob V.

The paper selection switch B1 serves to designate, as a printing paper, one between an OHP sheet and a heat-sensitive paper.

The magnification selection switch B2 serves to designate, as a magnification for copying, one among equiscale, enlarged scale and reduced scale.

As the lamp switch B3 is depressed while the lamp 112 is off, the first relay 83 of FIG. 10 makes a connection to turn the lamp 112 on. As the lamp switch B3 is depressed while the lamp 112 is on, the first relay 83 breaks the connection to turn the lamp 112 off.

As the copy start/stop switch B4 is depressed while the image forming unit is not operative, the second relay 84 makes a connection to start copying. As the copy start/stop switch B4 is depressed while the image forming unit is operative, the second relay 84 breaks the connection to stop copying.

If the copy start/stop switch B4 is depressed while the lamp switch B3 is on, this input is ignored. Reversely, if the lamp switch B3 is depressed during copying as the copy start/stop switch B4 is on, this input also is ignored. There is no priority between the copy start/stop switch B4 and the lamp switch B3; it is only enough that copying is impossible while the lamp 112 is on, and lighting of tee lamp 112 is impossible during the copying However, if a paper is inserted in the inlet port A while the lamp 112 is on, the paper can be supplied, irrespective of the power source and the illumination heat of the lamp 112.

As shown in FIGS. 4 and 5, a magnet 66 is mounted on a free end of the paper tray 21 and is adapted to be attracted to a companion magnet 67. These two magnet 66, 67 serve to prevent any accidental opening of the original cover 26 and also any accidental moving of the support table 2.

The mode of operation of the apparatus will now be described. To utilize the image forming function of the apparatus, the original cover 26 is opened, and then an initial original is placed on the transparent plate 24 with the image surface facing transparent plate 24, and thereafter the original cover 28 is closed. Then the copy start/stop switch B4 mounted on the operation panel 34 is depressed to start the copying operation of the apparatus. In place of a sheet-sensitive copy paper, a sheet such as a heat-sensitive color forming paper or a heat-sensitive transfer paper is supplied to the paper supply unit of the body 1 so that an original for OHP (hereinafter called "OHP") can be formed from the initial original. For manual insertion of a copy paper, the paper tray 21 is laid flat, and then a paper is supplied to the body 1 from the inlet port A by hand. The paper is then supplied between the paper supply roller 14 and the platen 12 for printing. If the paper is a roll paper, the roll paper is supplied from the paper guide 23 directly between the platen 12 and the discharge roller 15.

In order to use the apparatus as OHP, the support table 2 is moved from the reflection-type focusing lens 5, i.e. the fresnel lens, and an OHP original is placed, whereupon the lamp switch B3 on the operation panel 34 is depressed. In response to the depression of the lamp switch B3, the OHP original is illuminated by the lamp 112, the light of this illumination is reflected by the focusing plate 5. The reflected light reaches the screen via the projecting lens 111 and the reflector mirror 32, both mounted in the projecting unit 6. As a result, an image of the OHP original is projected on the screen.

More specific operation routine of the apparatus will now be described with reference to FIGS. 11(A) through 11(D).

Figure 11A:
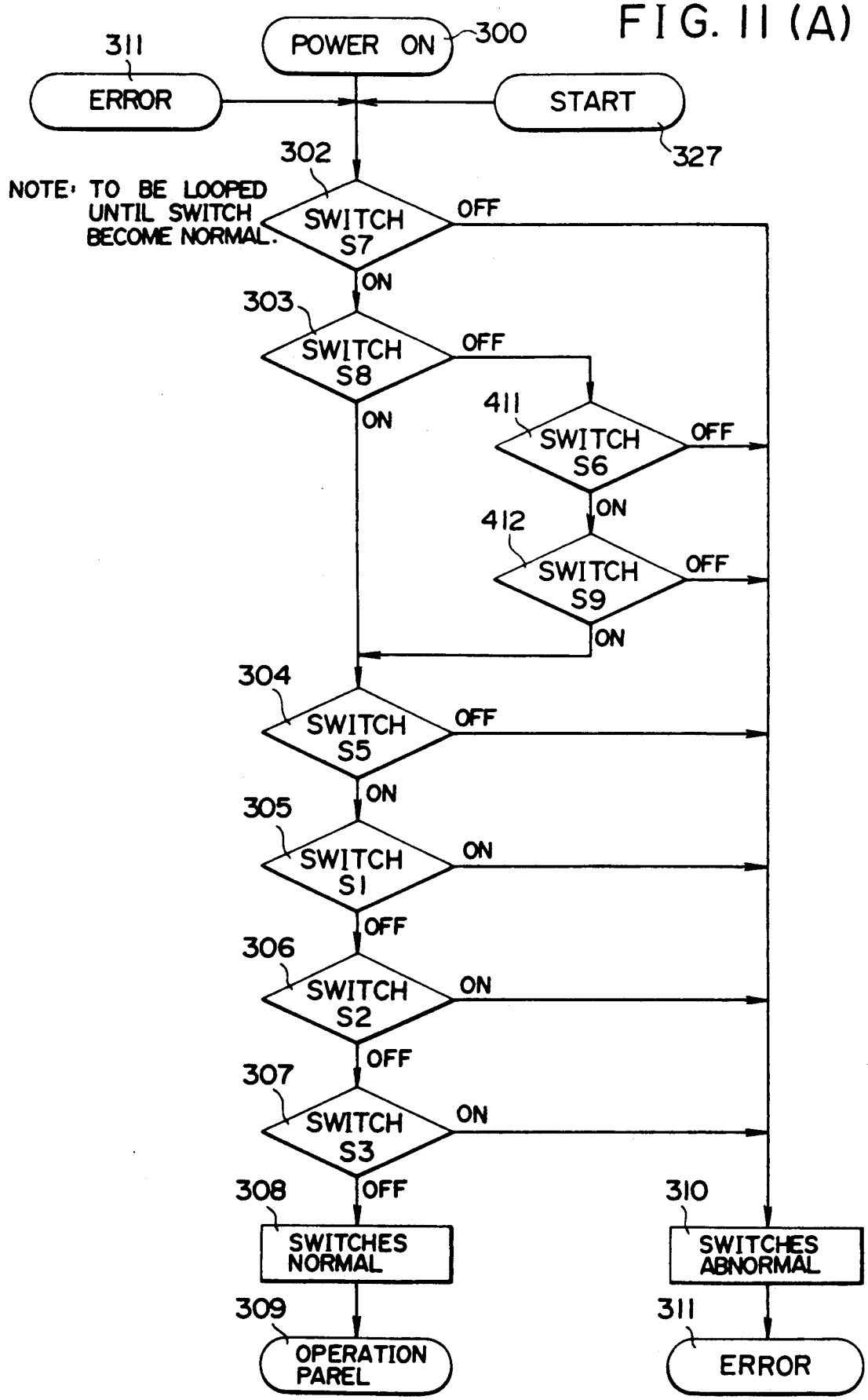

In FIG. 11(A), at step 300 the power source switch S10 is switched on to power the apparatus.

Then at steps 302 to 307, it is checked whether the switches S7, S8, S5, S3 are all on or off; if they are on, it is judged at step 308 that these switches are normal so that the operations of the operation panel 34 can be performed at step 309.

If each of these switches is off, all of the switches except the switch S8 are judged as abnormal at step 310. At step 311 the abnormal switches (copy start/stop switch B4 is on) are looped until they become normal.

If the switch S8 is off, it is checked at steps 411, 412 whether both the switches S6, S9 are on or off to judge whether the reflection mirror 32 and the projecting unit 6 are accommodated or not.

Figure 11B:
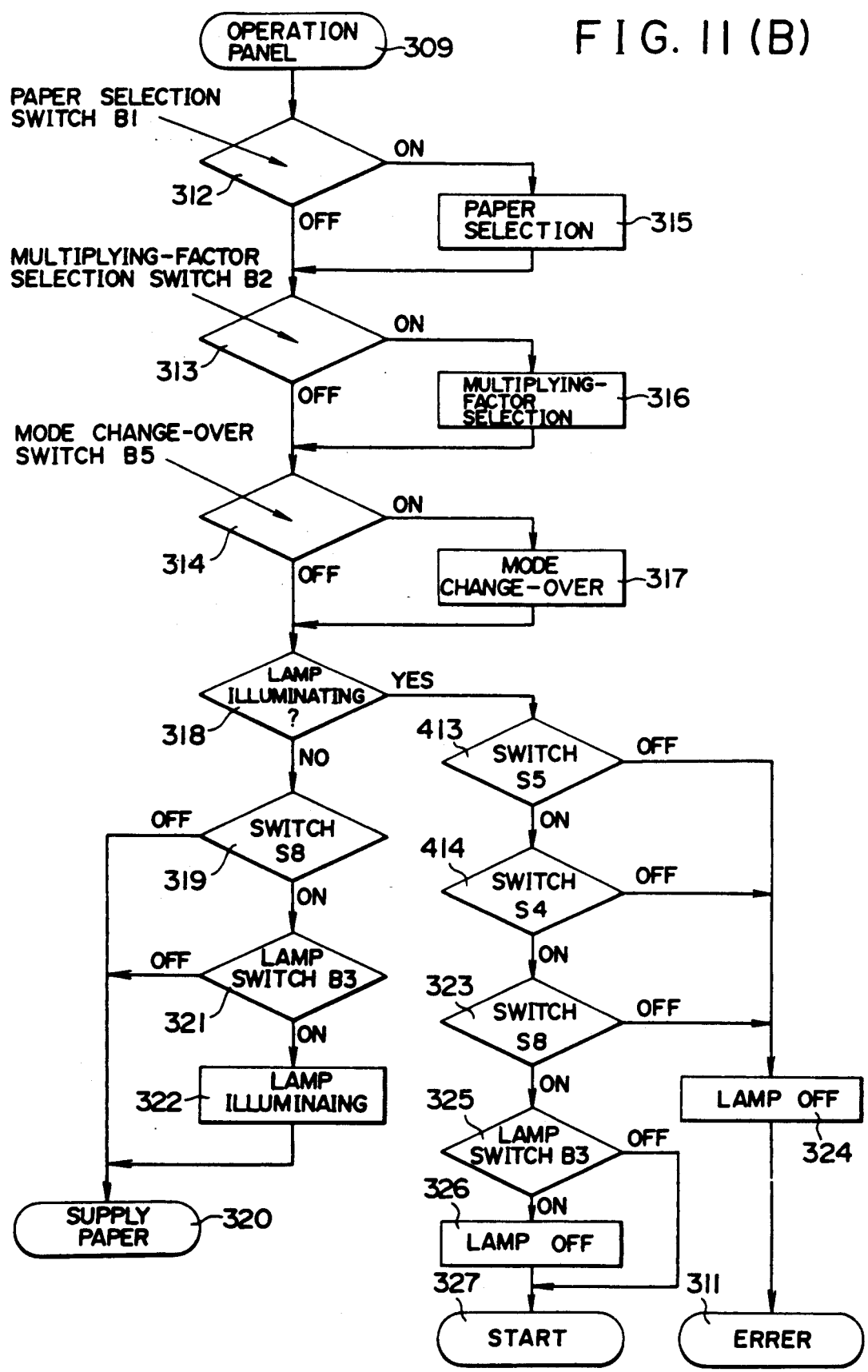

When the operations of the operation panel 34 have been made possible, it is checked at steps 312, 313, 314, as shown in FIG. 11(B), whether the paper selection switch B1, the magnification selection switch B2, and the mode change-over switch B5 are all on or off. If they are on, selection of a paper, selection of a multiplying power, and change-over of a mode are performed at steps 315, 316, 317.

Upon termination of selection of a paper and a multiplying power and of change-over of a mode, it is checked at step 318 whether the lamp 112 is turned on. If the lamp 112 is on, it is judged at step 319 whether the projecting unit 6 is set (switch S8 is on) or not; if the switch S8 is off, the paper supplying can be performed.

Further, with the projecting unit 6 having been set, if the lamp switch B3 is switched on at step 321, the lamp 112 is turned on at step 322, whereupon the operation routine goes to step 320. If the OHP original is set on the focusing plate 5 when the lamp 112 is on, the OHP original is projected on the screen via the projecting lens 111 and the reflector mirror 32.

If it is judged at step 318 that the lamp 112 is on, the state of the switch 5 is checked at 413. Then if the switch 5 is off, the lamp 112 is turned off at step 324, whereupon the routine goes to step 311 of FIG. 11 (A). During the lamp 112 is on, if the switch 5 is on, the support table 2 is moved to turn off the switch S4 (step 414), whereupon the routine goes to step 324 to switch off the lamp 112 so that the support table 2 is prevented from being heated to become deformed.

If the switches S4, S5 are on, the state of the projecting unit 6 is judged at step 323; if the switch S8 is off (i.e., the projecting unit 6 is not set), the lamp 112 is switched off at step 324, whereupon the routine goes to step 311.

If the switch S8 is on at step 323, the lamp switch S3 is switched on to turn the lamp 112 off, whereupon the routine goes to step 327 of FIG. 11(A).

Figure 11C:
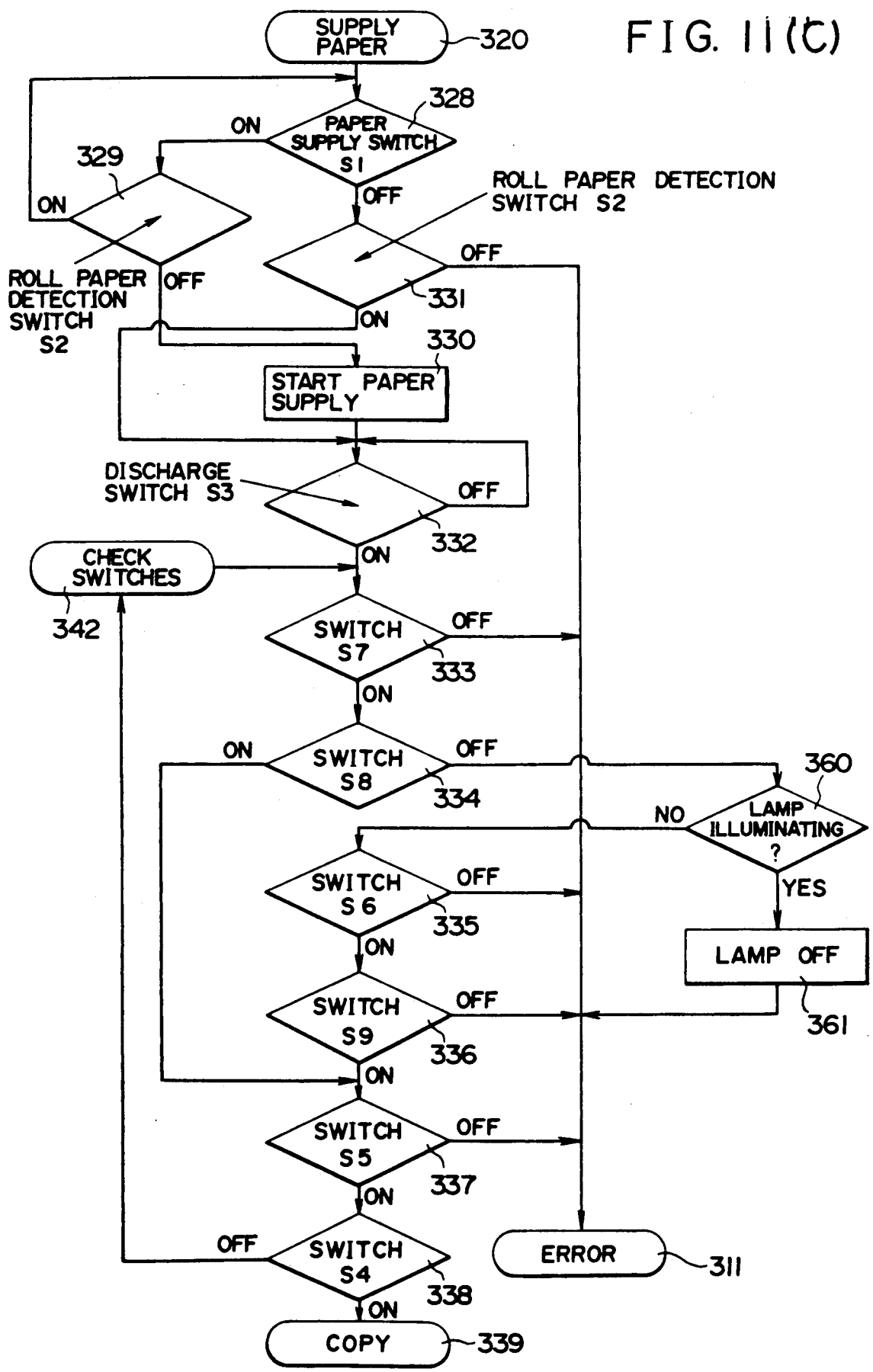

If the routine goes to the paper supplying operation at step 320, the condition of the switch S1 is judged at step 328 as shown in FIG. 11(C). Thus it is checked whether the paper is set in the paper inlet port A or not.

If the paper supply switch S1 is on, the condition of the roll paper detection switch S2 is judged at step 329, namely, it is checked whether the roll paper is set or not. If the roll paper is not set, the platen 12 is driven to supply a paper inserted by hand.

If the paper supply switch S1 is off at step 328, it is checked at step 331 whether the roll paper detection switch S2 is on or off; if it is off, the routine goes to FIG. 11(A).

If the roll paper detection switch S2 is on at step 331, or if the paper supply operation starts at step 330, the condition of the discharge switch S3 is checked at step 332. If the discharge switch S3 is on, it is an error when the switch S7 is off at step 333, whereupon routine goes to step 311.

If the switch S7 is on, the switch S8 is checked at step 334. If the switch S8 is on, the routine goes to step 337. If it is off, it is checked at step 360 whether the lamp 112 is turned on or off; if it is off at step 361, it is an error, whereupon the routine goes to step 311.

If the lamp 112 is off, it is checked at steps 335, 336 whether the switches S9, S5 are both on or off. If they are off, it is an error, whereupon the routine goes to step 311. If they are on, the switch S4 is checked at step 338, and the support table 2 is set at the starting position by hand. If the switch S4 is switched on, the routine goes to step 339.

If the switch S4 is off, return to step 342 to check the switch S4 until the switch S4 is turned on.

When the routine goes to step 339, it is judged at step 340, as shown in FIG. 11(D), whether the lamp 112 is on or not. If it is on, the routine goes to step 327 of FIG. 11(A). Thus even if a paper is set while the lamp 112 is on, copying operation is impossible.

If the lamp 112 is off, the switch B4 is checked at step 341. If it is off, the routine goes to step 342 of FIG. 11(C) to check the switch B4.

If the switch B4 is switched on, copying operation starts at step 343. As the motor 90 is thereby driven, the support table 2 on the focusing plate 5 starts moving leftwardly. After the original is read out by the read-out unit 3, printing is performed by the thermal head 13. When the paper supply switch S1 is on at step 415, it is judged that there is something wrong if the discharge paper switch S3 is off at step 416, and then the routine goes to step 311. If the discharge switch S3 is on, the routine goes to step 356.

At the start of copying, when the paper supply switch S1 is off at step 415, it is judged that there is something wrong if the paper discharge switch S3, and then the routine goes to step 311. If the switch S3 is on, the platen is reversed at step 418 to make a feedback; if the switch S3 is on at step 419, the feedback loop continues until the switch S3 is off. If the switch S3 is off, the step to reverse the platen is set at step 420, the feedback loop continues, until a predetermined number of steps is counted, in such a manner that the leading end of the paper comes very short of the thermal head 13 at step 421. After this counting, the platen is stopped at step 422, and the routine goes to step 356 to perform the usual copying operation.

At that time, if the switches S7, S5 are both switched off, copying operation is stopped at step 346, whereupon the routine goes to step 311 of FIG. 11(a). If the switches S7, S5 are both on, the condition of the switch S8 before copying starts is checked at step 347.

If the switch S8 is off, the accommodated conditions of the reflector mirror 32 and the projection are checked at steps 348, 349. When the accommodated condition is released (switches S6, S9 are off), copying operation is stopped at step 346.

Even though the switch S8 is on, copying operation is stopped when the switch S8 is switched off at step 350.

Then it is checked at step 351 whether the read-out of the original has been completed or not. If the switch S4 is on, the copying operation is stopped, and the paper is discharged at step 353, whereupon return to step 327 of FIG. 11(A).

If the switch S4 is off, it is checked at step 354 whether a predetermined time has passed (after the trailing end of a paper had passed the switch S1 or the switch S2), whereupon copying operation is stopped.

Even before the termination of copying operation, if the copy start/stop switch B4 is positively switched on at step 355, copying operation is stopped; if it remains off, the routine goes to step 356. Further, if it is failed to feed out or discharge a certain amount of copied part of the sheet after the copying is stopped, the feedback is repeated to make a print over the previous printed portion when the next copying is started. Consequently, if the arrangements are made so as to get started normally after having been feedbacked, the sheet must be discharged a predetermined length (corresponding to the feedbacked amount) without fail after the copying is finished or stopped at step 423.

In the image processing apparatus of the present invention, during projecting, the movement of the support table 2 from its retracted position toward the reflection-type focusing plate 5 or the opening of the reflection-type focusing plate 5 is detected simply as the copying termination switch S4 is off, then stopping the projecting. Accordingly, this image processing apparatus does not require an independent mechanism for detecting the movement of the support table 2 during projecting and also a special mechanism for detecting the opening of the reflection-type focusing plate 5.

According to the present invention, it is possible to effectively preventing the support table from being deformed or otherwise damaged due to the heat by the focusing plate. It is also possible to prevent the central axis of light of the focusing plate from deviating and thus to avoid the danger that the reflected light accidentally strikes on the operator's eye.

Further, partly since the sheet is feedbacked equally either when starting the copying or when restarting the copying after temporarily stopped, and partly since the sheet is fed out or discharged a length equal to the feedbacked part without fail after finished or temporarily stopped, it is possible not only to perform the control with east, but also to make sure what is being copied, by observing the discharged part of the sheet when temporarily stopped.

For another advantageous result, because the continuous sheet is fed backwardly a predetermined length before starting the image forming and forwardly a predetermined length after terminating the image forming, it is possible to form an image on the continuous sheet without any break, thus avoiding a waste of a continuous sheet. Consequently the service time of a continuous sheet can be extended remarkably, thereby reducing the entire apparatus into a compact size without difficulty.

For still another advantageous result, since the initial image is compressed in the subscanning direction and remains unchanged in the primary direction when providing an OHP original, a virtually square OHP original can be prepared from an somehow elongated rectangular initial original (e.g., vertical A4 size). Therefore it is possible to reduce the present apparatus into a compact size, compared to the typical prior art apparatus which requires a focusing plate having the same size as the OHP original.

Still further, since an OHP original can be prepared in substantially the same size as the focusing plate, it is possible to keep the OHP original free from shifting or slippage on the focusing plate during projecting, thus enlarging the observable range of image as ample as possible, which is easy to see of course.

In the foregoing embodiments, an OHP original compressed in the subscanning direction is prepared. Alternatively, an OHP original compressed in the subscanning direction and remaining the original scale in the primary scanning direction may be prepared; in this case also, the resulting image has been enlarged in the primary scanning direction without any break, which is also very easy to see.

The image processing apparatus of the present invention may be equipped with various additional functions.

Figure 13:
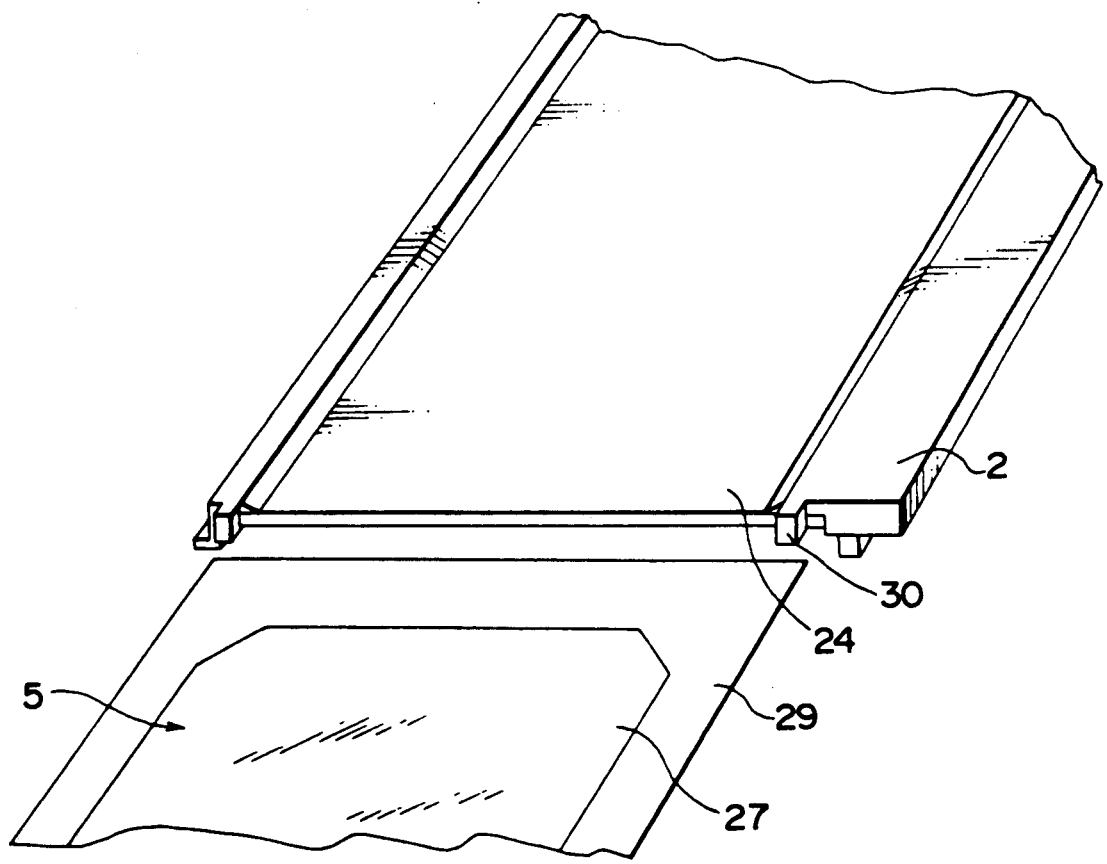
FIG. 13 is a fragmentary perspective view of the apparatus of FIG. 12, showing the positional relation between a support table and a reflection-type focusing plate.

For example, as shown in FIGS. 12 and 13, the support table 2 has, on its focusing-plate-side end at a position off the imaginary extension of the reflection-type focusing plate 5, a projection 30 which serves to prevent the support table 2 from contact with the focusing plate 5. With this projection 30, when the support table 2 and the focusing plate 5 are about to come into contact with each other as the former assumes its open posture, the projection 30 on the support table 2 engages the original cover 29 carried on the apparatus body in which the focusing plate 5 is accommodated, thus preventing the support table 2 and the focusing plate 5 from direct interference with each other.

Figure 14:
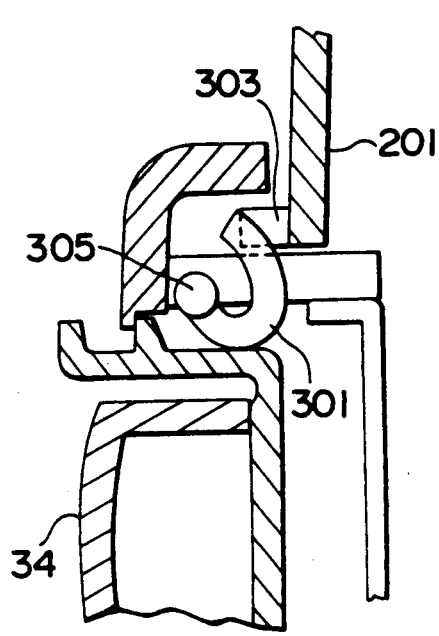
FIGS. 14 and 15 are detail cross-sectional views showing the manner in which a coupling operating member for use in the present invention is attached.
Figure 15:
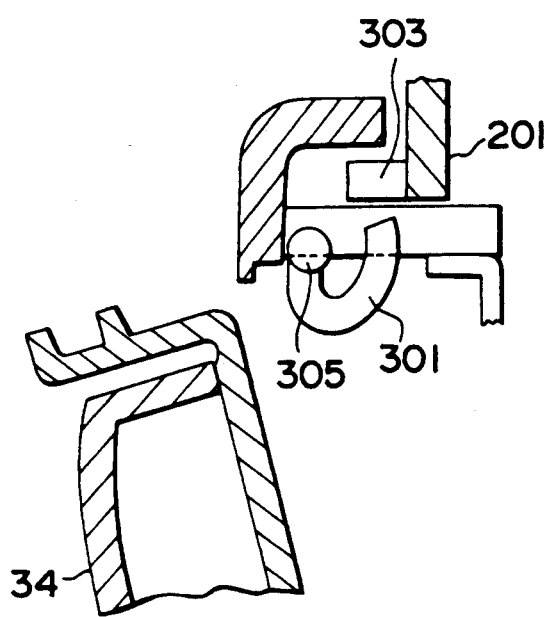

Further, as shown in FIGS. 14 and 15, the operation panel 34 may be pivotable, and in response to the pivotal movement of the operation panel 34, the movement of the support table 2 may be prevented. Specifically, a U-shaped hook 301 is pivotally mounted on the upper end of the operation panel 34 by the shaft 305, and the support table 2 is provided with a locking cutaway 303 receptive of the hook 301. As its curved portion is pushed by the upper end of the operation panel 34, the hook 301 is angularly moved until its one end is engaged in the locking cutaway 303, thereby preventing the movement of the support table 2. The hook 301 is normally urged by a spring (not shown) away from the locking cutaway 303.

When projecting or copying, the operation panel 34 must mandatorily be opened; that is, projection or copying cannot be performed until the operation panel 34 is released to open.

Figure 16:
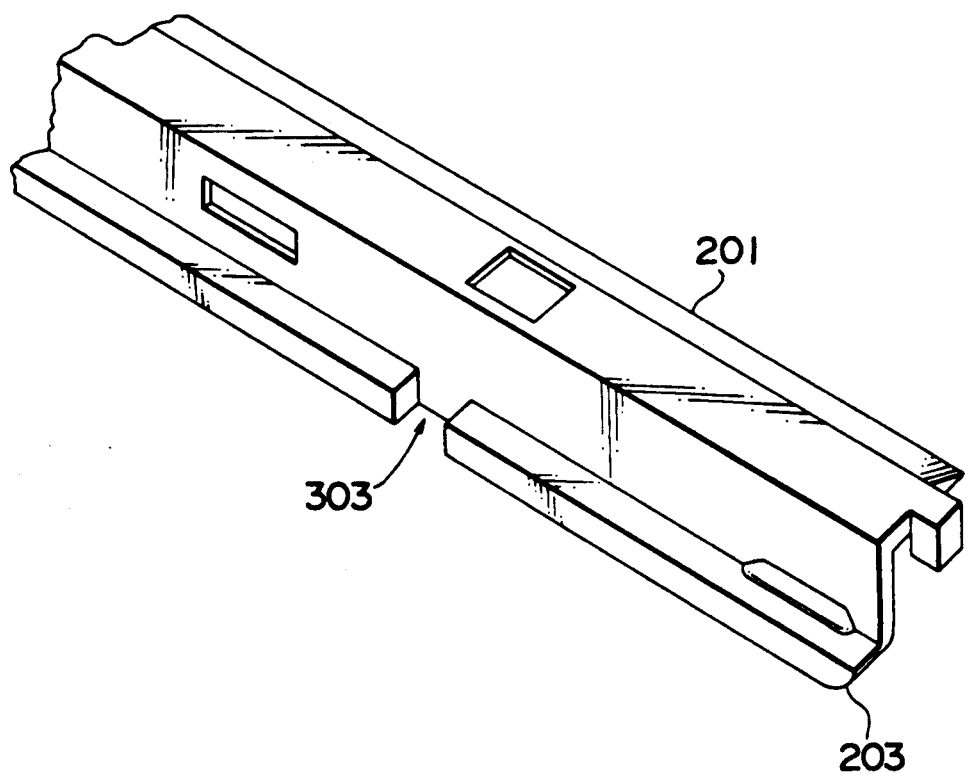
FIG. 16 is a perspective view of a front side frame member of the support table on which frame member the coupling operating member is mounted.

As shown in FIGS. 13 and 16, the transparent plate 24 holding the front side frame 201 of the support table 2 is entirely made of resiliently deformable plastics. Likewise the hook 301 is made of resiliently deformable plastics. Accordingly, when the hook 301 is out of engagement with the locking cutaway 303, the support table 2 is allowed to be moved against the resilience of the front side frame 201, until the support table 2 arrives at its locking position where the hook 301 is brought in engagement with the locking cutaway 303 reliably. The front frame 201 is chamfered at one end 203 with which the support table 2 first comes in contact, and so the support table 2 is allowed to move forwardly on the reflection-type focusing plate 5 smoothly.

With this arrangement, when the support table 2 is not located above the focusing plate 5 even if the operation panel 34 is closed, the hook 301 does not contact the front side frame 201 but only projecting upwardly above the front side frame 201. Then as the support table 2 is moved, the hook 301 strikes the front side frame 201 on the chamfered portion 203 thereof; this chamfered corner portion 203 serves to relax the impact between the front side frame 201 and the support table 2, thus assisting the latter to move to a predetermined locking position smoothly. In this locking position, the hook 301 is brought into locking engagement with the locking cutaway 303 automatically. Thus the operability of the apparatus has been improved very much.

Still with this arrangement, partly since the locking operation member such as an operation panel is pivotally supported on the side of the apparatus body, and partly since the locking member to releasably lock the support table and the apparatus body with one another, the support table is allowed to move if the support table and the apparatus body are out of their locking position. Therefore the locking between the support table and the apparatus body can be prevented until the support table is located in the locking position.

Irrespective of the position of the support table, it can be moved all the way to a predetermined position after the operation panel has been closed. Then in the predetermined position, the support table can be locked with the apparatus body automatically, causing a remarkably improved operability.

According to the present invention, the locking operation member should not be limited to the operation panel and may be a paper supply tray, a handle or a similar part.

Figure 17:
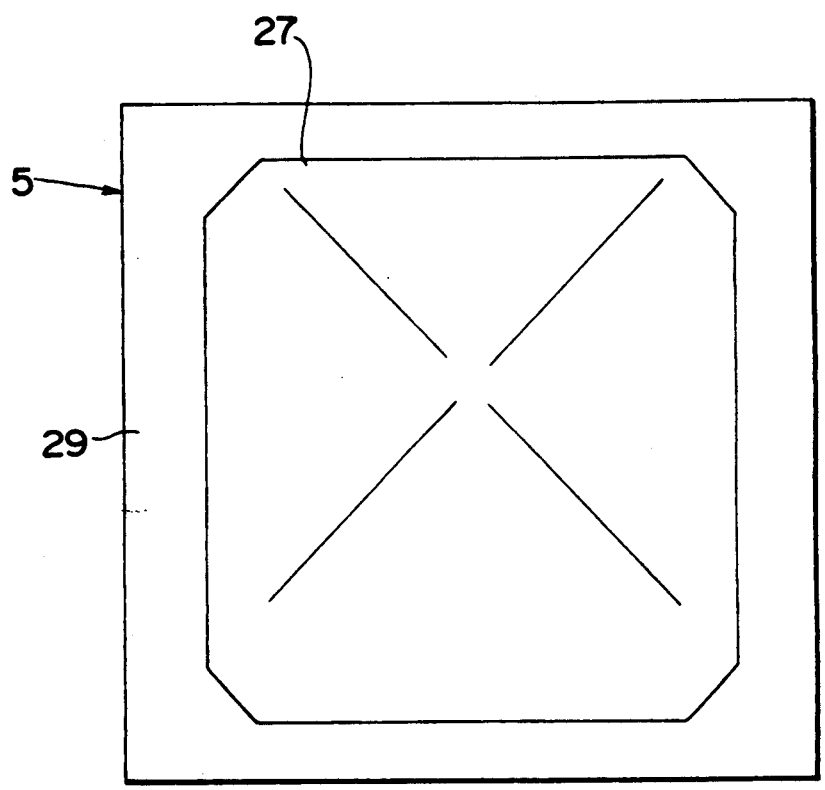
FIG. 17 is a plan view of a reflection-type focusing plate for use in the present invention.
Figure 18:
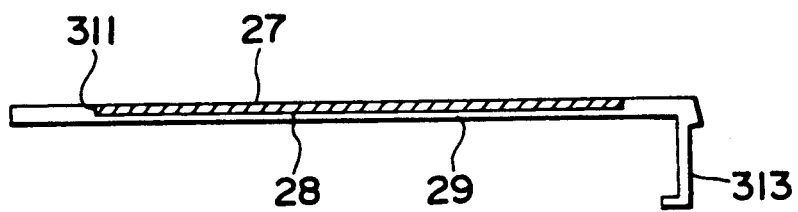
FIG. 18 is a cross-sectional view of FIG. 17.

As shown in FIGS. 17 and 18, the top cover 29 accommodating and holding the focusing plate 5 is generally of a rectangular shape and has in its upper surface a recess 311 of a predetermined depth. In this recess 311, a focusing plate 5 comprising a fresnel lens is received so as to flush with the top cover 29. Designated 313 is a mounting tongue downwardly projecting perpendicularly from one edge of the top cover 29 and adapted to be engageable with a focusing-plate support frame 315.

Figure 19:
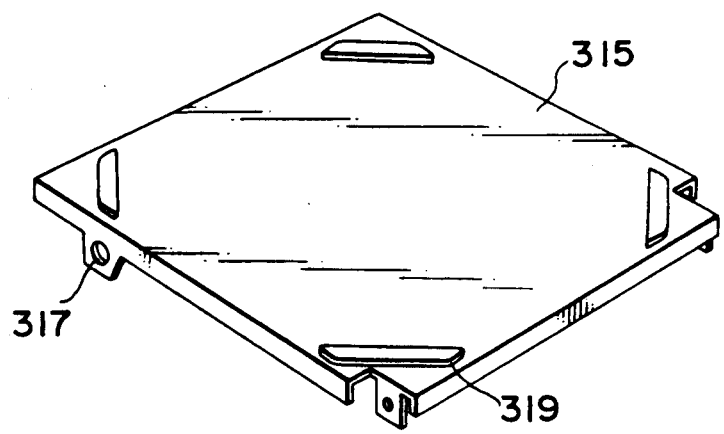
FIG. 19 is a perspective view of a support frame for the reflection-type focusing plate of FIG. 17.

The focusing-plate support frame 315, as shown in FIG. 19, is of the same shape as the top cover 29 and are bent downwardly along its all four edge portions to achieve an improved mechanical strength. An opposed pair of the four bent edge portions has a pair of shaft bearing portions 317, 317 (only one shown) receptive of the shaft 305 so that the support frame 315 can be pivotally moved about the shaft 305. On the upper surface of the support frame 315, there are disposed four ridges 319 of a predetermined height one at each of the four corners. These four corner ridges 319 serve to assist in supporting the respective four corners of the focusing plate 5 when the top cover 29 holding the focusing plate 5 is attached to the support frame 315.

According to this arrangement, even if the support frame 315 is deformed so as to bulge centrally when a load is exerted on its open end when the top cover 29 is pivotally moved to open or close, such deformation of the support frame 315 does not reach the focusing plate 5, thus keeping the focusing plate 5 in its horizontal posture. This is because there is defined, between the central portion of the support frame 315 and the central portion of the focusing plate 5, a gap equal to the height of the corner ridges 319 formed on the support frame 315.

In an alternative form, the support frame 315 may be provided with at least three ridges or a continuous projection on both the shaft-bearing side and the open side.

With the arrangement of FIG. 19, since the support frame supports the reflection-type focusing plate only along the peripheral portions, the focusing plate is free from deformation, guaranteeing a projected image that is not distorted and hence very planar.

Figure 20:
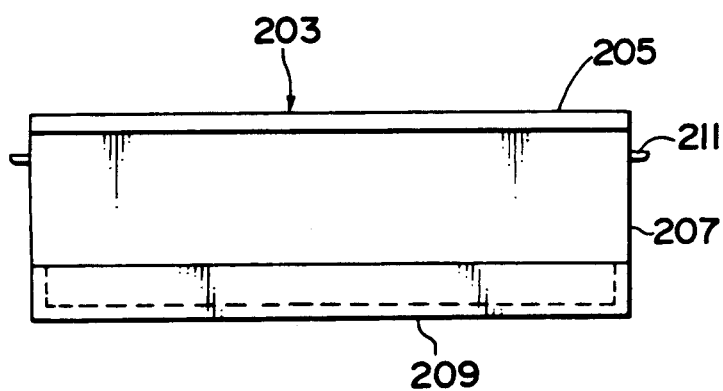
FIG. 20 is a front elevational view of a come-down-part accommodation case for use in the present invention; and, FIG. 21 is a side elevational view of FIG. 20.
Figure 21:
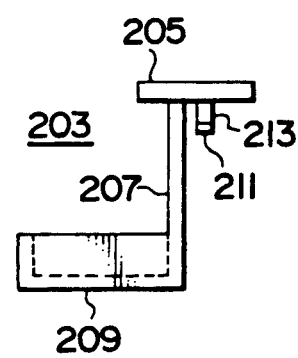

For an additional feature of the present invention, as shown in FIGS. 20 and 21, the apparatus body 1 may be provided with a come-down-part accommodation case 203 on the side of the shaft 305 of the focusing plate 5.

The case 203 is composed of a horizontal plate 205 for covering the wiring codes in the body 1, a vertical plate 207 extending perpendicularly to the horizontal plate 205, and a container 209 disposed on and along the lower edge of the vertical plate 207. Designated by 211 are a pair of removal prevention pins projecting one from each end of the vertical plate 207 longitudinally thereof and disposed at a distal end of a resilient arm 213 extending downwardly from the horizontal plate 205.

When the resilient arm 213 is resiliently deformed so as to release the pins 211, the case 203 can be removed from the body 1 easily to open the focusing plate 5 so that filling of a paper roll and maintenance work may be done. The case 203 receives foreign matter such as dust, litter, clip, etc. slipped on the focusing plate 5 to fall into the body 1, thus keeping the interior parts and wiring cords free from any influence of the foreign matter.

What is claimed is:

1. An image processing apparatus comprising:
   (a) an input unit for inputting an image of an initial original in terms of image signals;
   (b) a support table on which the initial original is to be set, said support table being movably mounted along said input unit;
   (c) an image processing unit for processing the image signals from said input unit;
   (d) an image forming unit for forming on a continuous sheet a subject image according to the image signals processed by said image processing unit to provide an OHP original;
   (e) a reflection-type focusing plate on which the OHP original is to be set, said reflection-type focusing plate being movably disposed alongside said input unit;
   (f) a projecting unit disposed above said reflection-type focusing plate for projecting the subject image of the OHP original set on said reflection-type focusing plate; and
   (g) means for detecting the movement of said support table or said reflection-type focusing plate to deenergize said projecting unit.

2. An image processing apparatus according to claim 1, further including means for preventing said support table and said reflection-type focusing plate from contacting each other during said support table is moving.

3. An image processing apparatus according to claim 1, further including a locking operation member movably supported on a body of said apparatus, and coupler means for releasably locking said support table and said body with each other at a locking position in response to the movement of said locking operation member and also for allowing said support table to move to said locking position when said locking operation member is moved to said locking position.

4. An image processing apparatus according to claim 1, further including a support frame pivotally supported on a body of said apparatus for holding said reflection-type focusing plate only along its peripheral portions therearound, said support frame having a shaft and being pivotally movable about said shaft.

5. An image processing apparatus according to claim 1, further including a come-down-part accommodation case supported on said body near said shaft.

6. An image processing apparatus according to claim 1, further including means for backwardly moving the continuous sheet along a predetermined length before the image forming is started, and means for forwardly moving the continuous sheet along a predetermined length after the image forming has been completed.

7. An image processing apparatus according to claim 1, wherein said image processing unit has a function of varying respective magnifications by which the image inputted from said input unit in primary scanning and/or subscanning directions.

* * * * *